(12) United States Patent
Erichsen et al.

(10) Patent No.: US 11,724,361 B2
(45) Date of Patent: Aug. 15, 2023

(54) AUTONOMOUS MODIFICATION OF WATERJET CUTTING SYSTEMS

(71) Applicant: Flow International Corporation, Kent, WA (US)

(72) Inventors: Glenn A. Erichsen, Everett, WA (US); Alex M. Chillman, Maple Valley, WA (US); Jordan J. Hopkins, Seattle, WA (US); Adam G. Law, Edmonds, WA (US); Amanda C. Kotchon, Seattle, WA (US); Paul H. Tacheron, Auburn, WA (US); Charles D. Burnham, Southbury, CT (US); Brian Kent, Maple Valley, WA (US); Mohamed Hashish, Bellevue, WA (US); Craig D. Sunada, Black Diamond, WA (US); Jiannan Zhou, Issaquah, WA (US)

(73) Assignee: Flow International Corporation, Kent, WA (US)

( * ) Notice: Subject to any disclaimer, the term of this patent is extended or adjusted under 35 U.S.C. 154(b) by 681 days.

(21) Appl. No.: 16/625,584

(22) PCT Filed: Jun. 21, 2018

(86) PCT No.: PCT/US2018/038741
§ 371 (c)(1),
(2) Date: Dec. 20, 2019

(87) PCT Pub. No.: WO2018/237138
PCT Pub. Date: Dec. 27, 2018

(65) Prior Publication Data
US 2021/0379729 A1 Dec. 9, 2021

Related U.S. Application Data

(60) Provisional application No. 62/523,979, filed on Jun. 23, 2017.

(51) Int. Cl.
*G05B 19/4097* (2006.01)
*B24C 1/04* (2006.01)

(52) U.S. Cl.
CPC .......... *B24C 1/045* (2013.01); *G05B 19/4097* (2013.01); *G05B 2219/36046* (2013.01);
(Continued)

(58) Field of Classification Search
CPC ...... G05B 19/4097; G05B 2219/36046; G05B 2219/36053; G05B 2219/36056;
(Continued)

(56) References Cited

U.S. PATENT DOCUMENTS

| 6,922,605 B1 | 7/2005 | Olsen |
| 6,996,452 B2 | 2/2006 | Erichsen et al. |

(Continued)

FOREIGN PATENT DOCUMENTS

| JP | H06503761 A | 4/1994 |
| JP | 2012106336 A | 6/2012 |

(Continued)

OTHER PUBLICATIONS

Zohoor et al. "Development of an algorithm for optimum control process to compensate the nozzle wear effect in cutting the hard and tough material using abrasive water jet cutting process" in "Int J Adv Manuf Technol (2012) 61:1019-1028" (Year: 2012).*

(Continued)

*Primary Examiner* — Yuhui R Pan
(74) *Attorney, Agent, or Firm* — Cozen O'Connor

(57) ABSTRACT

Systems and methods for providing real-time modification of cutting process programs using feedback from one or more sensors which measure one or more operational (Continued)

parameters of a cutting process and/or cutting apparatus. The sensor readings may be used to provide real-time modification of a motion program after such motion program has been provided to a motion controller. Examples of such operational parameters may include waterjet pump supply pressure, the abrasive mass flow rate, the force of the waterjet on the target piece, etc. The systems and methods discussed herein also utilize a cutting algorithm or program to calculate actual cut quality based on one or more sensor inputs, and to generate warnings or system shut-downs accordingly. The systems and methods discussed herein also utilize inspection devices to inspect coupons or first articles, and use the inspection data to autonomously modify motion programs and/or cutting process models without user intervention.

13 Claims, 15 Drawing Sheets

(52) U.S. Cl.
CPC .............. *G05B 2219/36053* (2013.01); *G05B 2219/36056* (2013.01); *G05B 2219/36505* (2013.01); *G05B 2219/37576* (2013.01); *G05B 2219/45036* (2013.01); *G05B 2219/49012* (2013.01)

(58) Field of Classification Search
CPC ........... G05B 2219/36505; G05B 2219/37576; G05B 2219/45036; G05B 2219/49012; Y02P 90/02; B24C 1/045
See application file for complete search history.

(56) References Cited

U.S. PATENT DOCUMENTS

| | | | |
|---|---|---|---|
| 7,035,708 B1 | 4/2006 | Olsen | |
| 2003/0065424 A1* | 4/2003 | Erichsen | ................. B24C 1/045 700/282 |
| 2012/0245742 A1* | 9/2012 | Clausmann | ............ B23Q 17/00 700/282 |
| 2014/0045409 A1* | 2/2014 | Zhang | .................... B65G 53/66 451/99 |
| 2015/0261204 A1 | 9/2015 | Honda | |
| 2015/0266161 A1* | 9/2015 | Noda | ...................... B24C 1/045 700/160 |

FOREIGN PATENT DOCUMENTS

| | | |
|---|---|---|
| JP | 2014097543 A | 5/2014 |
| JP | 2014144528 A | 8/2014 |
| JP | 2015178143 A | 10/2015 |
| WO | 2014045030 A1 | 3/2014 |
| WO | WO-2014045030 A1 * | 3/2014 ............. B24C 1/045 |

OTHER PUBLICATIONS

International Search Report and Written Opinion of the International Searching Authority, dated Dec. 3, 2018, issued in corresponding International Application No. PCT/US2018/038741, filed Jun. 21, 2018, 22 pages.
Notice of Reasons for Rejection dated Apr. 27, 2022, for Japanese Application No. 2019-560659, 16 pages.
Notice of Reasons for Rejection dated Feb. 16, 2023, for Japanese Application No. 2019-560659, 8 pages.

* cited by examiner

AUTONOMOUS MODIFICATION OF WATERJET CUTTING SYSTEMS

BACKGROUND

Technical Field

The present disclosure generally relates to systems, methods, and articles for planning, generating and controlling paths for tools used to manufacture objects.

Description of the Related Art

Multi-axis machining is a manufacturing process where computer numerically controlled (CNC) tools that move in multiple ways are used to manufacture objects by removing excess material. Systems used for this process include waterjet cutting systems, laser cutting systems, plasma cutting systems, electric discharge machining (EDM), and other systems. Typical multi-axis CNC tools support translation in 3 axes and support rotation around one or multiple axes. Multi-axis machines offer several improvements over other CNC tools at the cost of increased complexity and price of the machine. For example, using multi-axis machines, the amount of human labor may be reduced, a better surface finish can be obtained by moving the tool tangentially about the surface, and parts that are more complex can be manufactured, such as parts with compound contours.

High-pressure fluid jets, including high-pressure abrasive waterjets, are used to cut a wide variety of materials in many different industries. Abrasive waterjets have proven to be especially useful in cutting difficult, thick, or aggregate materials, such as thick metal, glass, or ceramic materials. Systems for generating high-pressure abrasive waterjets are currently available, such as, for example, the Mach 4™ 5-axis abrasive waterjet system manufactured by Flow International Corporation, the assignee of the present application, as well as other systems that include an abrasive waterjet cutting head assembly mounted to an articulated robotic arm. Other examples of abrasive waterjet cutting systems are shown and described in Flow's U.S. Pat. Nos. 5,643,058, 6,996,452, 6,766,216 and 8,423,172, which are incorporated herein by reference. The terms "high-pressure fluid jet" and "jet" should be understood to incorporate all types of high-pressure fluid jets, including but not limited to, high-pressure waterjets and high-pressure abrasive waterjets. In such systems, high-pressure fluid, typically water, flows through an orifice in a cutting head to form a high-pressure jet (or "beam"), into which abrasive particles are combined as the jet flows through a mixing tube. The high-pressure abrasive waterjet is discharged from the mixing tube and directed toward a workpiece to cut the workpiece along a designated path, commonly referred to as a "toolpath."

Various systems are available to move a high-pressure fluid jet along a designated path. Such systems may commonly be referred to, for example, as three-axis and five-axis machines. Conventional three-axis machines mount the cutting head assembly in such a way that the cutting head assembly can move along an x-y plane and perpendicular along a z-axis, namely toward and away from the workpiece. In this manner, the high-pressure fluid jet generated by the cutting head assembly is moved along the designated path in an x-y plane, and is raised and lowered relative to the workpiece, as may be desired. Conventional five-axis machines work in a similar manner but provide for movement about two additional non-parallel rotary axes. Other systems may include a cutting head assembly mounted to an articulated robotic arm, such as, for example, a 6-axis robotic arm which articulates about six separate axes.

Manipulating a jet about five axes may be useful for a variety of reasons, for example, to cut a three-dimensional shape. Such manipulation may also be desired to correct for cutting characteristics of the jet or for the characteristics of the cutting result. More particularly, a cut produced by a jet, such as an abrasive waterjet, has characteristics that differ from cuts produced by more traditional machining processes. Two of the cut characteristics that may result from use of a high-pressure fluid jet are referred to as "taper" and "trailback."

FIG. 1 is an example illustration of taper. Taper is a phenomenon resulting from the width of a jet 10 from a cutting apparatus 12 changing from its entry into a target piece 14 to its exit from the target piece. The taper angle $\alpha_{taper}$ refers to the angle of a plane of the cut wall relative to a vertical plane. Jet taper typically results in a target piece that has different dimensions on the top surface (where the jet enters the workpiece) than on the bottom surface (where the jet exits the workpiece). The taper distance $D_{taper}$ of the waterjet 10 is also shown in FIG. 1.

FIG. 2 is an example illustration of trailback. Trailback, also referred to as stream lag, identifies the phenomenon that the high-pressure fluid jet exits the target piece 14 at a point behind the point of entry of the jet 10 into the target piece by a distance $D_{trail}$ and angle $\alpha_{trail}$, relative to the direction of travel indicated by arrow 18. These two cut characteristics, namely taper and trailback, may or may not be acceptable, given the desired end product. Taper and trailback vary depending upon the speed the cut is made and other process parameters, such as material thickness. The fastest speed that the jet 10 travels in order to reliably produce separation of part of the material from another part may be referred to as "separation speed." Thus, one known way to control excessive taper and/or trailback is to slow down the cutting speed of the system. In situations where it is desirable to minimize or eliminate taper and/or trailback, conventional five-axis systems have been used, primarily by manual trial and error, to apply angular corrections to the jet (by adjusting the cutting head apparatus) to compensate for taper and trailback as the jet moves along the cutting path.

BRIEF SUMMARY

A fluid jet apparatus control system may be summarized as including at least one nontransitory processor-readable storage medium that stores at least one of processor-executable instructions or data; and at least one processor communicably coupled to the at least one nontransitory processor-readable storage medium, in operation the at least one processor: receives an initial motion program for a target object which is to be cut by a fluid jet apparatus, the initial motion program includes at least one of a lead angle program, a taper angle program, or a corner control program; executes a motion program to cause the fluid jet apparatus to cut the target object according to the received initial motion program; and from time-to-time during execution of the motion program, autonomously receives at least one operational parameter of the fluid jet apparatus from at least one sensor; dynamically modifies at least one of the lead angle program, the taper angle program, or the corner control program based at least in part on the received at least one operational parameter to generate a modified motion program; and executes the motion program to cause the fluid jet apparatus to cut the target object according to the modified motion program. The at least one sensor may include at least one of a supply pressure sensor, an abrasive mass flow rate sensor or a force sensor. The at least one sensor may include a supply pressure sensor and an abrasive mass flow rate sensor.

The at least one processor may dynamically modify at least two of the lead angle program, the taper angle program, and the corner control program based at least in part on the received at least one operational parameter to generate a modified motion program. The at least one processor may dynamically modify each of the lead angle program, the taper angle program, and the corner control program based at least in part on the received at least one operational parameter to generate a modified motion program. The at least one processor may dynamically modify a cutting speed of the fluid jet apparatus based at least in part on the received at least one operational parameter. The at least one processor may dynamically modify at least one of the lead angle program, the taper angle program, or the corner control program during execution of the motion program with a response rate which is less than or equal to 200 milliseconds. The fluid jet apparatus control system may include a motion controller.

The at least one processor may receive a commanded percent cut speed of the fluid jet apparatus; determine an actual percent cut speed of the fluid jet apparatus based at least in part on the received at least one operational parameter; compare the actual percent cut speed of the fluid jet apparatus to the received commanded percent cut speed; determine whether the actual percent cut speed differs from the commanded percent cut speed by more than an allowed percent cut speed threshold value; and responsive to a determination that the actual percent cut speed differs from the commanded percent cut speed by more than the allowed percent cut speed threshold value may cause a warning to be generated; or cause the fluid jet apparatus to at least pause the cutting of the target object. Responsive to a determination that the actual percent cut speed differs from the commanded percent cut speed by more than the allowed percent cut speed threshold value, the at least one processor may cause at least one of a visual warning or an audible warning to be generated. Responsive to a determination that the actual percent cut speed differs from the commanded percent cut speed by more than the allowed percent cut speed threshold value, the at least one processor may cause the fluid jet apparatus to terminate the cutting of the target object.

A method of autonomously controlling a fluid jet apparatus may be summarized as including receiving, by at least one processor, an initial motion program for a target object which is to be cut by a fluid jet apparatus, the initial motion program including at least one of a lead angle program, a taper angle program, or a corner control program; executing, by the at least one processor, a motion program to cause the fluid jet apparatus to cut the target object according to the received initial motion program; and from time-to-time during execution of the motion program, autonomously receiving, by the at least one processor, at least one operational parameter of the fluid jet apparatus from at least one sensor; dynamically modifying, by the at least one processor, at least one of the lead angle program, the taper angle program, or the corner control program based at least in part on the received at least one operational parameter to generate a modified motion program; and executing, by the at least one processor, the motion program to cause the fluid jet apparatus to cut the target object according to the modified motion program. Autonomously receiving at least one operational parameter of the fluid jet apparatus may include autonomously receiving at least one operational parameter of the fluid jet apparatus from at least one of a supply pressure sensor, an abrasive mass flow rate sensor or a force sensor. Dynamically modifying at least one of the lead angle program, the taper angle program, or the corner control program may include dynamically modifying at least two of the lead angle program, the taper angle program, and the corner control program based at least in part on the received at least one operational parameter to generate a modified motion program.

The method may further include receiving, by the at least one processor, a commanded percent cut speed of the fluid jet apparatus; determining, by the at least one processor, an actual percent cut speed of the fluid jet apparatus based at least in part on the received at least one operational parameter; comparing, by the at least one processor, the actual percent cut speed of the fluid jet apparatus to the received commanded percent cut speed; determining, by the at least one processor, whether the actual percent cut speed differs from the commanded percent cut speed by more than an allowed percent cut speed threshold value; and responsive to determining that the actual percent cut speed differs from the commanded percent cut speed by more than the allowed percent cut speed threshold value: causing, by the at least one processor, a warning to be generated; or causing, by the at least one processor, the fluid jet apparatus to at least pause the cutting of the target object.

The method may further include receiving, by the at least one processor, the allowed percent cut speed threshold value as input from at least one user interface communicatively coupled to the at least one processor. Causing a warning to be generated may include causing at least one of a visual warning or an audible warning to be generated. Causing the fluid jet apparatus to at least pause the cutting of the target object may include causing the fluid jet apparatus to terminate the cutting of the target object.

A fluid jet apparatus control system may be summarized as including a controller clock; at least one nontransitory processor-readable storage medium that stores at least one of processor-executable instructions or data; and at least one processor communicably coupled to the at least one non-transitory processor-readable storage medium, in operation the at least one processor: receives an initial motion program for a target object which is to be cut by a fluid jet apparatus; receives a reference separation cut speed; executes a motion program to cause the fluid jet apparatus to cut the target object according to the received initial motion program; and from time-to-time during execution of the motion program, autonomously receives at least one operational parameter of the fluid jet apparatus from at least one sensor; autonomously determines a modified separation cut speed based at least in part on the received at least one operational parameter; and autonomously adjusts a clock rate of the controller clock to cause the fluid jet apparatus to cut the target object based at least in part on the modified separation cut speed. The at least one processor may adjust a clock rate of the controller clock so that a ratio of a new clock rate to a previous clock rate matches a ratio of the modified separation cut speed to a previous reference separation cut speed. The initial motion program may include at least one of a lead angle program, a taper angle program, or a corner control program. The at least one sensor may include at least one of a supply pressure sensor, an abrasive mass flow rate sensor or a force sensor. The at least one sensor may include a supply pressure sensor and an abrasive mass flow rate sensor.

The at least one processor may receive a commanded percent cut speed of the fluid jet apparatus; determine an actual percent cut speed of the fluid jet apparatus based at least in part on the received at least one operational parameter; compare the actual percent cut speed of the fluid jet apparatus to the received commanded percent cut speed; determine whether the actual percent cut speed differs from the commanded percent cut speed by more than an allowed percent cut speed threshold value; and responsive to a determination that the actual percent cut speed differs from the commanded percent cut speed by more than the allowed percent cut speed threshold value may cause a warning to be generated; or cause the fluid jet apparatus to at least pause the cutting of the target object. The at least one processor may receive the allowed percent cut speed threshold value from at least one user interface communicatively coupled to the at least one processor. Responsive to a determination that the actual percent cut speed differs from the commanded percent cut speed by more than the allowed percent cut speed threshold value, the at least one processor may cause at least one of a visual warning or an audible warning to be generated. Responsive to a determination that the actual percent cut speed differs from the commanded percent cut speed by more than the allowed percent cut speed threshold value, the at least one processor may cause to the fluid jet apparatus to terminate the cutting of the target object.

A method of autonomously controlling a fluid jet apparatus may be summarized as including receiving, by at least one processor, an initial motion program for a target object which is to be cut by a fluid jet apparatus; receiving, by at least one processor, a reference separation cut speed; executing, by the at least one processor, a motion program to cause the fluid jet apparatus to cut the target object according to the received initial motion program; and from time-to-time during execution of the motion program, autonomously receiving, by the at least one processor, at least one operational parameter of the fluid jet apparatus from at least one sensor; autonomously determining, by the at least one processor, a modified separation cut speed based at least in part on the received at least one operational parameter; and autonomously adjusting, by the at least one processor, a clock rate of a controller clock to cause the fluid jet apparatus to cut the target object based at least in part on the modified separation cut speed. Autonomously adjusting a clock rate of the controller clock may include autonomously adjusting a clock rate of the controller clock so that a ratio of a new clock rate to a previous clock rate matches a ratio of the modified separation cut speed to a previous reference separation cut speed.

The method may further include receiving, by the at least one processor, a commanded percent cut speed of the fluid jet apparatus; determining, by the at least one processor, an actual percent cut speed of the fluid jet apparatus based at least in part on the received at least one operational parameter; comparing, by the at least one processor, the actual percent cut speed of the fluid jet apparatus to the received commanded percent cut speed; determining, by the at least one processor, whether the actual percent cut speed differs from the commanded percent cut speed by more than an allowed percent cut speed threshold value; and responsive to determining that the actual percent cut speed differs from the commanded percent cut speed by more than the allowed percent cut speed threshold value: causing, by the at least one processor, a warning to be generated; or causing, by the at least one processor, the fluid jet apparatus to at least pause the cutting of the target object. Causing a warning to be generated may include causing at least one of a visual warning or an audible warning to be generated.

A method of autonomously controlling a fluid jet apparatus to cut a target object may be summarized as including inspecting, by at least one inspection device, a cut of a coupon which has been cut by the fluid jet apparatus; receiving, by at least one processor, inspection data from the inspection device based at least in part on the inspection of the cut of the coupon; modifying, by the at least one processor, at least one cutting process model based at least in part on the received inspection data; generating, by the at least one processor, a motion program based at least in part on the modified at least one cutting process model; and executing, by the at least one processor, the generated motion program to cause the fluid jet apparatus to cut the target object according to the generated motion program. Inspecting the cut of the coupon may include inspecting the cut of the coupon for at least one process attribute comprising a trailback amount, a trailback profile or a taper profile. Inspecting the cut of the coupon may include inspecting at least one of a width of the cut of the coupon and a front profile of the cut of the coupon. Inspecting the cut of the coupon may include inspecting the cut of the coupon in at least a first direction and a second direction. Inspecting the cut of the coupon may include inspecting the cut of the coupon utilizing at least one of a probe, a camera or a laser. Inspecting the cut of the coupon may include inspecting the cut of the coupon to determine a shape of a trailback profile thereof. Inspecting the cut of the coupon may include inspecting the cut of the coupon to determine the bow of the cut of the coupon. Modifying at least one cutting process model may include modifying the at least one cutting process model with respect to at least one of taper angle, lead angle or cutting speed.

The method may further include executing, by the at least one processor, an initial motion program to cause the fluid jet apparatus to cut the coupon according to the initial motion program. Executing the initial motion program to cause the fluid jet apparatus to cut the coupon may include causing the fluid jet apparatus to cut the coupon at a lead angle specified by an initial cutting process model for cutting the target object. Executing the initial motion program to cause the fluid jet apparatus to cut the coupon may include causing the fluid jet apparatus to cut the coupon at a lead angle equal to 0 degrees. Modifying the at least one cutting process model may include modifying the at least one cutting process model to account for at least one of: taper angle, lead angle, bow, diameter of a mixing tube of the fluid jet apparatus, kerf profile, or wear of a nozzle of the fluid jet apparatus.

A fluid jet apparatus control system may be summarized as including a fluid jet apparatus; at least one inspection device; at least one nontransitory processor-readable storage medium that stores at least one of processor-executable instructions or data; and at least one processor communicably coupled to the at least one nontransitory processor-readable storage medium, the at least one inspection device, and the fluid jet apparatus, in operation the at least one processor: causes the at least one inspection device to inspect a cut of a coupon which has been cut by the fluid jet apparatus; receives inspection data from the inspection device based at least in part on the inspection of the cut of the coupon; modifies at least one cutting process model based at least in part on the received inspection data; generates a motion program based at least in part on the modified at least one cutting process model; and executes the generated motion program to cause the fluid jet apparatus to cut a target object according to the generated motion program. The at least one inspection device may inspect the cut of the coupon for at least one process attribute comprising a trailback amount, a trailback profile or a taper profile. The at least one inspection device may inspect at least one of a width of the cut of the coupon and a front profile of the cut of the coupon. The at least one inspection device may inspect the cut of the coupon in at least a first direction and a second direction. The at least one inspection device may include at least one of a probe, a camera or a laser. The at least one inspection device may determine a shape of a trailback profile of the cut of the coupon. The at least one inspection device may determine the bow of the cut of the coupon. The at least one processor may modify the at least one cutting process model with respect to at least one of taper angle, lead angle or cutting speed. The at least one processor may execute an initial motion program to cause the fluid jet apparatus to cut the coupon according to the initial motion program. The at least one processor may cause the fluid jet apparatus to cut the coupon at a lead angle specified by an initial cutting process model for cutting the target object. The at least one processor may cause the fluid jet apparatus to cut the coupon at a lead angle equal to 0 degrees. The at least one processor may modify the at least one cutting process model to account for at least one of: taper angle, lead angle, bow, diameter of a mixing tube of the fluid jet apparatus, kerf profile, or wear of a nozzle of the fluid jet apparatus.

A method of autonomously controlling a fluid jet apparatus may be summarized as including inspecting, by at least one inspection device, a first target object which has been cut by the fluid jet apparatus; receiving, by at least one processor, inspection data from the inspection device based at least in part on the inspection of the cut of the first target object; modifying, by the at least one processor, at least one motion program based at least in part on the received inspection data; and executing, by the at least one processor, the modified motion program to cause the fluid jet apparatus to cut a second target object according to the modified motion program, the second target object at least similar to the first target object with respect to one or more physical characteristics. Inspecting a first target object may include inspecting the first target object to identify errors in a first plane, and modifying the at least one motion program includes modifying at least one motion program to correct for identified errors in the first plane. Inspecting a first target object may include inspecting the first target object to identify errors in a plurality of surfaces of the first target object, and modifying the at least one motion program includes modifying at least one motion program to correct for identified errors in the plurality of surfaces. Modifying at least one motion program may include modifying at least one cut angle for the fluid jet apparatus specified by the motion program.

A fluid jet apparatus control system may be summarized as including a fluid jet apparatus; at least one inspection device; at least one nontransitory processor-readable storage medium that stores at least one of processor-executable instructions or data; and at least one processor communicably coupled to the at least one nontransitory processor-readable storage medium, the at least one inspection device, and the fluid jet apparatus, in operation the at least one processor: causes the at least one inspection device to inspect a first target object which has been cut by the fluid jet apparatus; receives inspection data from the inspection device based at least in part on the inspection of the cut of the first target object; modifies at least one motion program based at least in part on the received inspection data; and executes the modified motion program to cause the fluid jet apparatus to cut a second target object according to the modified motion program, the second target object at least similar to the first target object with respect to one or more physical characteristics. The at least one inspection device may inspect the first target object to identify errors in a first plane, and the at least one processor may modify at least one motion program to correct for identified errors in the first plane. The at least one inspection device may inspect the first target object to identify errors in a plurality of surfaces of the first target object, and the at least one processor may modify at least one motion program to correct for identified errors in the plurality of surfaces. The at least one processor may modifies at least one cut angle for the fluid jet apparatus specified by the motion program.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
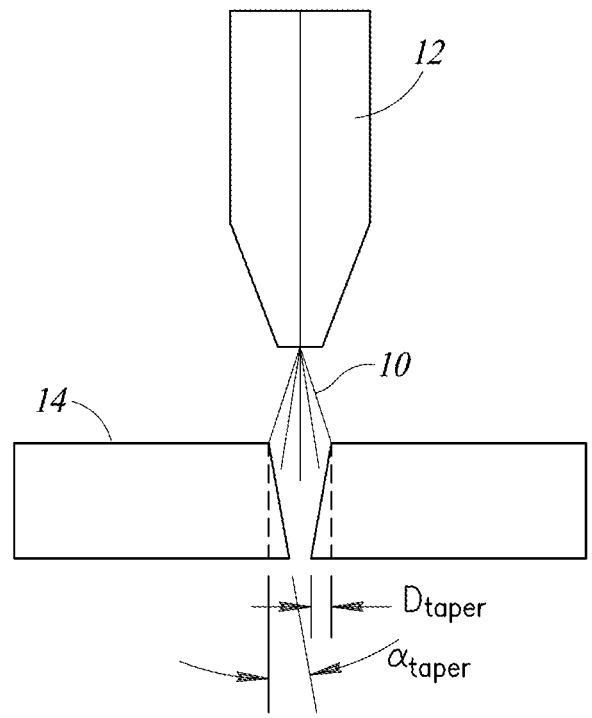
FIG. 1 is a schematic diagram which illustrates taper for a waterjet cutting process.
Figure 2:
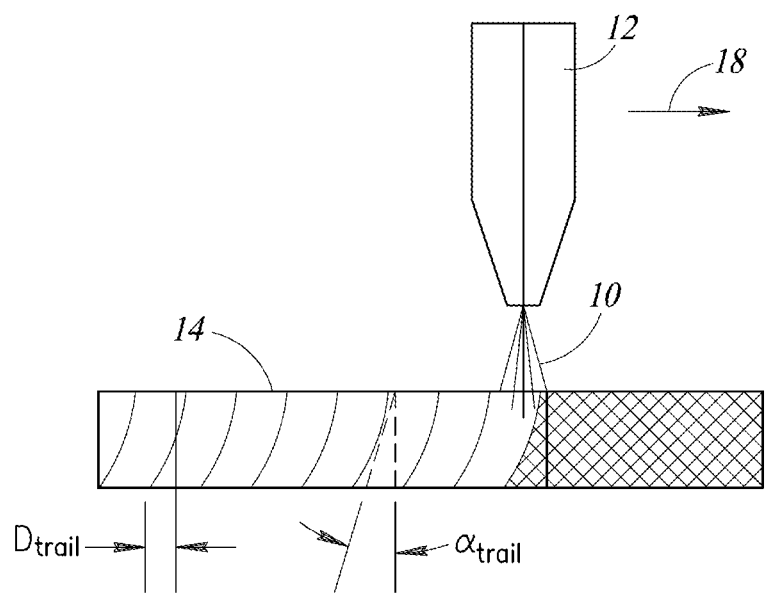
FIG. 2 is a schematic diagram which illustrates trailback for a waterjet cutting process.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure provide enhanced processor-based methods, systems, and techniques for adjusting jet orientation models in a waterjet cutting system in real-time to compensate for variations in process parameters to achieve superior control over the surface of the cut and resulting piece generated by the cut. Currently, when utilizing dynamic waterjet cutting solutions, an operator enters the process conditions in a setup interface. Such "pre-processing" setup is followed by the generation of a motion program which can be provided to a motion controller. In reality, the system parameters input by the operator may not be the real or actual system parameters. For example, a user may input a supply pressure of 87,000 pounds per square inch (psi), when in reality the system operates at a different pressure (e.g., 83,000 psi, 95,000 psi). Similarly, the system parameters input may change during the cutting process. For example, during the course of a cutting process a slow dynamic seal failure may lead to leakage and an inability to reach the full pressure set during pre-processing setup. One or more implementations discussed herein allow for real-time modification to a motion program after the motion program has been delivered to a motion controller (e.g., CNC controller, PMAC motion controller). For example, in some implementations the system provides real-time tuning of dynamic waterjet cutting models, including lead angle models, taper angle models, and/or corner control models, etc.

It should be appreciated that modification to a motion program to generate a "modified motion program" may be achieved in several ways. For example, a motion program may include a series or list of specific steps (e.g., move to point one, move to point two, etc.). In at least some implementations, a motion program may be modified by leaving the original motion program intact while adding one or more small additional moves. Such moves may be done through kinematics routines or offsets to motor commands, for example. That is, the original motion program may not be altered, but the effects (e.g., intended results) of the program may be modified to produce a "modified motion program." In at least some implementations, a motion program may be modified by modifying the original list of steps of motion program (e.g., move to modified point one, move to modified point two, etc.).

The dynamic waterjet cutting models discussed further below may be dependent on multiple process parameters. Examples of such process parameters include the waterjet pump supply pressure, the abrasive mass flow rate, the force of the waterjet on the target piece, etc. If one or more of these process parameters vary during the process of cutting, corrective dynamic waterjet cutting models may apply an inaccurate correction (e.g., for taper). As discussed below, implementations of the present disclosure measure one or more process parameters using suitable sensors or transducers and provide the measured process parameters as inputs to refine or otherwise modify one or more dynamic waterjet cutting models in real-time (e.g., 10 milliseconds (ms) or less, 200 ms or less). Such inputs may be fed to a motion controller via a suitable motion controller interface or module. In at least one implementation, any measureable parameter which relates to cutting speed may be used for the real-time adjustments discussed herein.

Example implementations provide an Adaptive Vector Control System ("AVCS") that automatically predicts how far the jet will deviate from the desired cutting path profile and automatically determines appropriate deviation correction angles that can be used to generate a motion control program or other data for controlling orientation of a cutting head apparatus. The deviation correction angles are determined as functions of the target piece geometry, as well as speed and/or other process parameters, as noted above. By determining the deviation correction angles and using them, as appropriate, to generate instructions in the motion control program/data (in a form dependent upon what the cutting head controller can process), the AVCS enables the cutting head apparatus/controller to automatically control the three dimensional position and tilt and swivel of the cutting head and hence the x-axis, y-axis, z-axis and angular positions of the jet, relative to the material being cut, as the jet moves along a cutting path in three dimensional space to cut the target piece. In at least some implementations, the AVCS where possible maximizes cutting speed while still maintaining desired tolerances.

In at least one implementation, the AVCS uses a set of advanced predictive models to determine the characteristics of an intended cut through a given material and to provide the deviation correction angles to account for predicted deviation of the jet from a straight-line trajectory. The predicted deviation may be related, for example, to the width of the jet changing as it penetrates through the material and/or the stream lag or deflection that results in the jet exiting at a point in some direction distant from the intended exit point. When cutting straight wall pieces, these cutting phenomena can be expressed as trailback/lag and taper and the corresponding deviation corrections expressed as lead compensation and taper compensation angles. However, when cutting more complicated pieces, such as non-vertical (beveled) surfaces, non-flat (curved) material, pieces with directional changes over the depth of the jet, pieces with different shapes on the top and on the bottom, etc., these deviations have directional components (such as forward, backward, and sideways terms relative to the direction and path of jet travel) that influence the deviations. The prediction of angular corrections thus becomes far more complex. Using advanced predictive models, the AVCS operates without manual (e.g., human) intervention and does not require special knowledge by the operator to run the cutting machine. The automatic nature of the AVCS thus supports decreased production time as well as more precise control over the cutting process, especially of complex parts.

Although discussed herein in terms of waterjets, and abrasive waterjets in particular, the described techniques can be applied to any type of fluid jet, generated by high pressure or low pressure, whether or not additives or abrasives are used. In addition, these techniques can be modified to control the x-axis, y-axis, z-offset, and tilt and swivel (or other comparable orientation) parameters as functions of process parameters other than speed, and the particulars described herein.

Figure 3:
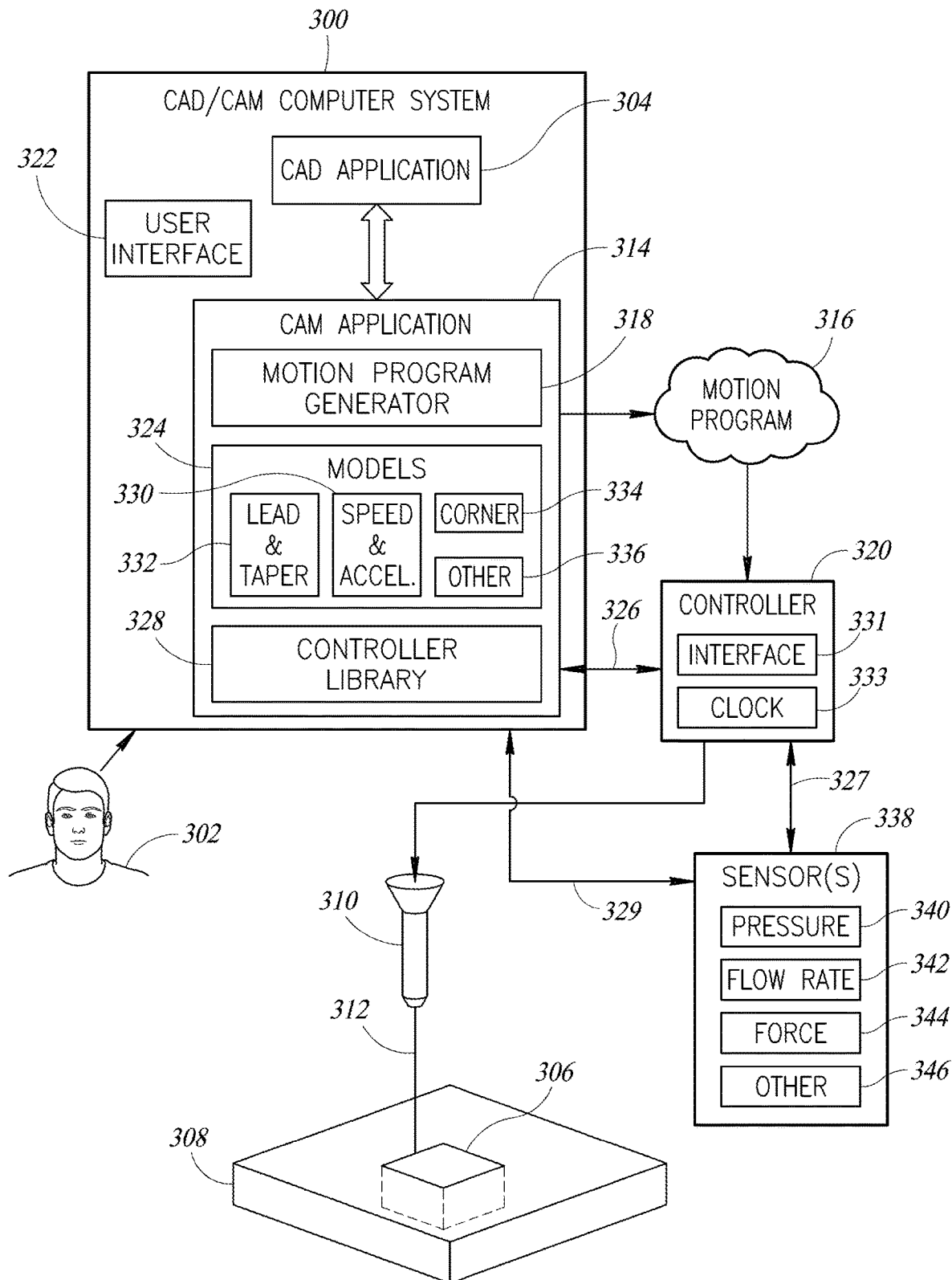
FIG. 3 is a functional block diagram of CAD/CAM system and cutting system, according to one illustrated implementation.
Figure 4:
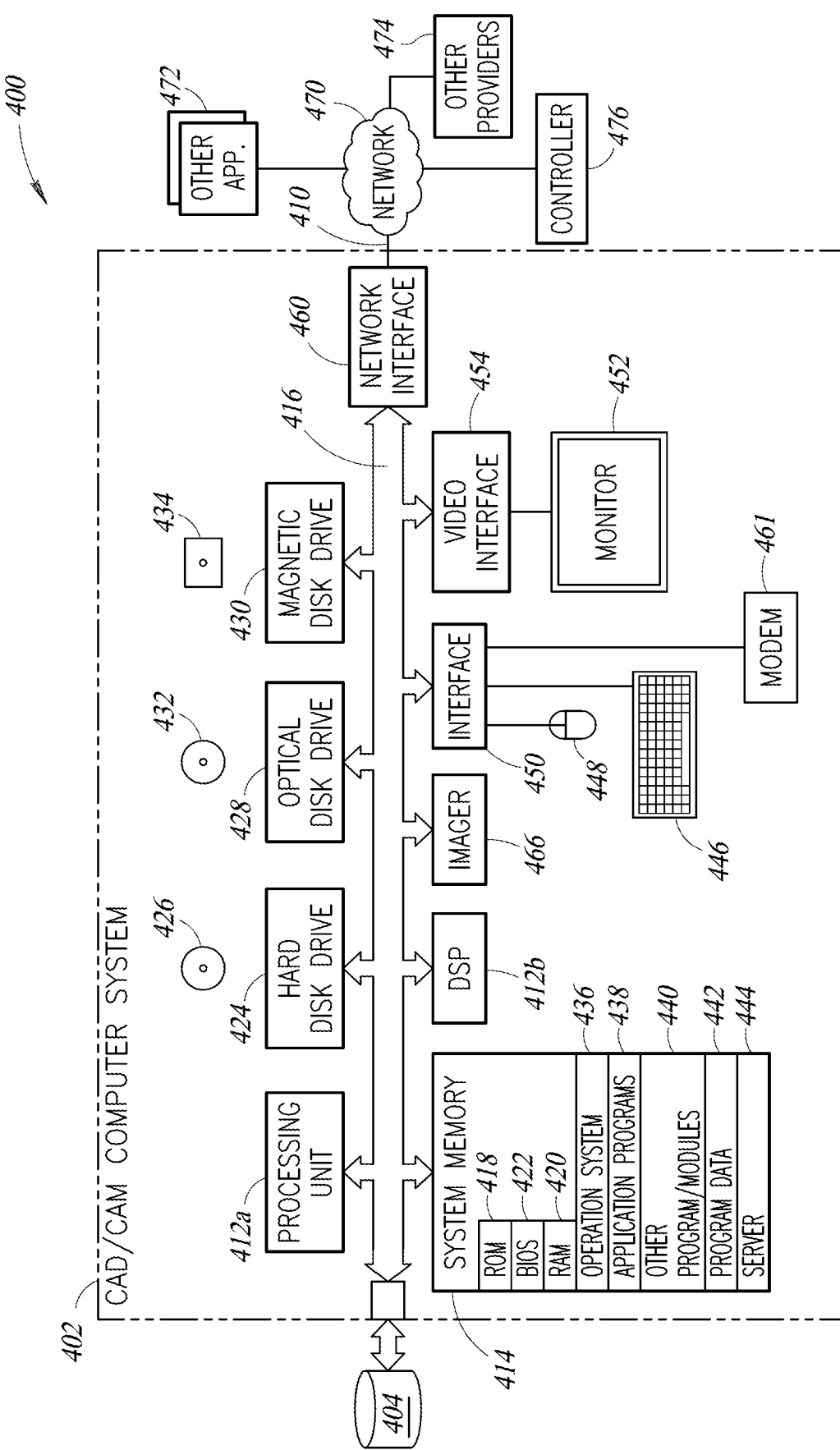
FIG. 4 is a functional block diagram of portions of the CAD/CAM system of FIG. 3, according to one illustrated implementation.

FIGS. 3 and 4 illustrate example systems which may be used to implementation the features of the present disclosure. FIGS. 5-9 are flow diagrams which illustrate the processes of implementing the features discussed herein.

FIG. 3 is a block diagram illustrating the use of a CAD/CAM computer system 300 to produce a target piece or object 306. In typical operation, an operator 302 uses a CAD application 304 executing on the CAD/CAM system 300 to specify a design of the target object 306 (e.g., a three dimensional object) to be cut from a workpiece material 308. The CAD/CAM system 300 may be directly or indirectly connected to an abrasive waterjet (AWJ) cutting apparatus 310 (or other type of cutting apparatus), such as the high-pressure fluid jet apparatus called the "Dynamic Waterjet® XD" sold by Flow International Corporation. The cutting apparatus 310 utilizes a cutting beam 312 (e.g., a waterjet, a laser beam, etc.) to remove material from the workpiece 308. Other 4-axis, 5-axis, or greater axis machines can also be used providing that the "wrist" of the fluid jet apparatus allows sufficient (e.g., angular) motion. Any existing CAD program or package can be used to specify the design of the target object 306 providing it allows for the operations described herein.

The CAD/CAM system 300 also includes a CAM application 314. The CAM application 314 may be incorporated into the CAD application 304, or vice versa, and may generally be referred to as a CAD/CAM application or system. Alternatively, the CAM application 314 may be separate from the CAD application 304. The CAD application 304 and CAM application 314 may reside on the same or different CAD/CAM systems 300. A system which implements a CAM application may be referred to as a "CAM system."

A solid 3D model design for the object 306 to be manufactured may be input from the CAD application 304 into the CAM application 314 which, as described in detail below, automatically generates a motion program 316 (or other programmatic or other motion related data) that specifies how the cutting apparatus 310 is to be controlled to cut the object 306 from the workpiece 308. The motion program 316 may be generated by a motion program generator application or module 318 within the CAM application 314. When specified by the operator, the CAM system 300 sends the motion program 316 to a hardware/software controller 320 (e.g., a computer numerical controller, "CNC") via a suitable interface or module 331, which directs the cutting apparatus 310 to cut the workpiece 308 according to the instructions contained in the motion program to produce the object 306. Used in this manner, the CAM application 314 provides a CAM process to produce target pieces.

Although the CAD/CAM system 300 described in FIG. 3 is shown residing on a CAD/CAM system separate from, but connected to, the cutting apparatus 310, the CAD/CAM system alternatively may be located on other devices within the overall system, depending upon the actual configuration of the cutting apparatus and the computers or other controllers associated with the overall cutting system. For example, the CAD/CAM system 300 may be embedded in the controller 320 of the cutting apparatus itself (as part of the software/firmware/hardware associated with the machine). As another example, the CAD/CAM system 300 may reside on a computer system connected to the controller 320 directly or through a network. In addition, the controller 320 may take many forms including integrated circuit boards as well as robotics systems. All such combinations or permutations are contemplated, and appropriate modifications to the CAD/CAM system 300 described, such as the specifics of the motion program 316 and its form, are contemplated based upon the particulars of the cutting system and associated control hardware and software.

In some implementations, the CAD/CAM system 300 includes one or more functional components/modules that work together to provide the motion program 316 to automatically control the tilt and swivel of the cutting apparatus 310 and other parameters that control the cutting apparatus, and hence the x-axis, y-axis, and z-axis and angular positions of the cutting beam 312 relative to the workpiece material 308 being cut, as the cutting beam moves along a machining path in three dimensional space to cut the object 306. These components may be implemented in software, firmware, or hardware or a combination thereof. The CAD/CAM system 300 may include the motion program generator 318, a user interface 322, such as a graphical user interface ("GUI"), one or more models 324, and an interface 326 to the cutting apparatus controller 320. The motion program generator 318 may be operatively coupled to the CAD application 304 and the user interface 322 to create the motion program 316 or comparable motion instructions or data that can be forwarded to and executed by the controller 320 to control the cutting apparatus 310, and hence the cutting beam 312. Alternative arrangements and combinations of these components are equally contemplated for use with techniques described herein. For example, in some implementations, the user interface 322 is intertwined with the motion program generator 318 so that the user interface controls the program flow and generates the motion program 316 and/or data. In another implementation, the core program flow is segregated into a kernel module, which is separate from the motion program generator 318.

The models 324 (also referred to as machining knowledge data) provide the motion program generator 318 with access to sets of mathematical models or data that may be used to determine appropriate cutting beam orientation and cutting process parameters. Each mathematical model may include one or more sets of algorithms, equations, tables, or data that are used by the motion program generator 318 to generate particular values for the resultant commands in the motion program 316 to produce desired cutting characteristics or behavior. For example, in a 5-axis machine environment, these algorithms/equations may be used to generate the x-position, y-position, z-standoff compensation value, lead angle, taper angle and deviation correction angles (for example, that are used to control the tilt and swivel positions of the cutting apparatus) of each command if appropriate. In some implementations, the models 324 include a set of algorithms, equations, tables, rules or data for generating deviation corrections, for generating speed and acceleration values, for determining machining paths including sequences for machining paths, and other models. The mathematical models or machining knowledge data may be created experimentally and/or theoretically based upon empirical observations and prior analysis of machining data and stored in or on one or more non-transitory computer- or processor-readable medium.

The models 324 may provide multiple mathematical models, typically in the form of software or other logic, that can be replaced without taking the machine off-line, for example in the form of "dynamic link libraries" (DLLs). In other implementations they may be non-replaceable and compiled or linked into the AVCS code, for example, in the form of static linked libraries. Other architectures are equally contemplated. For example, in one implementation, the models 324 include a set of algorithms, equations, tables, or data for generating lead and taper angle values 332; a set of algorithms, equations, tables, or data for generating speed and acceleration values 330; a set of algorithms, equations, tables, or data for generating modified cutting process parameter values for cutting curves, corners, etc. 324; and other models 326. The mathematical models 324 are typically created experimentally and theoretically based upon empirical observations and prior analysis of cutting data.

In some implementations, the CAD/CAM system 300 communicates instructions or data to the controller 320 (e.g., via a controller library 328) through the interface or module 331 of the controller coupled to the CAD/CAM system by a suitable wired and/or wireless link 326, which provides functions for two way communication between the controller and the CAD/CAM system. These controller functions may be used, for example, to display the machining path in progress while the object 306 is being cut out of the workpiece 308. They may also be used to obtain values of the cutting apparatus 310, such as the current state of the attached mechanical and electrical devices, as discussed below. In implementations where the CAD/CAM system 300 is embedded in the controller 320 or in part of the cutting apparatus 310, some of these components or functions may be eliminated.

A number of sensors 338 may be provided which are operative to measure one or more process parameters in real-time during execution of the cutting process. As an example, the number of sensors 338 may include a system pressure sensor 340, a waterjet abrasive mass flow rate sensor 342, a force applied to the part sensor 344, and/or other sensors 346. Outputs from each of the one or more sensors 338 may be fed to the controller 320 via a suitable wired and/or wireless link 327 coupled to the interface or module 331 of the controller. Additionally or alternatively, the outputs from each of the one or more sensors 338 may be fed to the CAD/CAM system 300 via a suitable wired and/or wireless link 329. As discussed further below, the controller 320 and/or the CAD/CAM system 300 may utilize feedback from the sensors 338 to modify the cutting process in real-time dependent on one or more process parameters measured or detected by the one or more sensors.

Many different arrangements and divisions of functionality of the components of a CAD/CAM system 300 are possible. The implementations described herein may be practiced without some of the specific details, or with other specific details, such as changes with respect to the ordering of the code flow, different code flows, etc., or the specific features shown on the user interface screens. Thus, the scope of the techniques and/or functions described is not limited by the particular order, selection, or decomposition of blocks described with reference to any particular routine or code logic. In addition, example implementations described herein provide applications, tools, data structures and other support to implement a CAD/CAM system 300 for cutting objects. Other implementations of the described techniques may be used for other purposes, including for other fluid jet apparatus cutting, laser beam cutting, etc.

FIG. 4 and the following discussion provide a brief, general description of a networked environment 400 that includes the components forming an exemplary CAD/CAM system 402 in which the various illustrated implementations can be implemented. Although not required, some portion of the implementations will be described in the general context of computer-executable instructions or logic, such as program application modules, objects, or macros being executed by a computer. Those skilled in the relevant art will appreciate that the illustrated implementations as well as other implementations can be practiced with other computer system configurations, including handheld devices for instance Web enabled cellular phones or PDAs, multiprocessor systems, microprocessor-based or programmable consumer electronics, personal computers ("PCs"), network PCs, minicomputers, mainframe computers, and the like. The implementations can be practiced in distributed computing environments where tasks or modules are performed by remote processing devices, which are linked through a communications network. In a distributed computing environment, program modules may be located in both local and remote memory storage devices.

The CAD/CAM system 402 may include one or more processing units 412a, 412b (collectively 412), a system memory 414 and a system bus 416 that couples various system components, including the system memory 414 to the processing units 412. The processing units 412 may be any logic processing unit, such as one or more central processing units (CPUs) 412a or digital signal processors (DSPs) 412b. The system bus 416 can employ any known bus structures or architectures, including a memory bus with memory controller, a peripheral bus, and/or a local bus. The system memory 414 includes read-only memory ("ROM") 418 and random access memory ("RAM") 420. A basic input/output system ("BIOS") 422, which can form part of the ROM 418, contains basic routines that help transfer information between elements within the CAD/CAM system 402, such as during start-up.

The processing unit(s) 412 may be any logic processing unit, such as one or more central processing units (CPUs), digital signal processors (DSPs), application-specific integrated circuits (ASICs), field programmable gate arrays (FPGAs), graphical processing units (GPUs), etc. Non-limiting examples of commercially available computer systems include, but are not limited to, an 80×86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, a 68xxx series microprocessor from Motorola Corporation, an ATOM processor, or an AX processor. Unless described otherwise, the construction and operation of the various blocks in FIG. 4 are of conventional design. As a result, such blocks need not be described in further detail herein, as they will be understood by those skilled in the relevant art.

The CAD/CAM system 402 may include a hard disk drive 424 for reading from and writing to a hard disk 426, an optical disk drive 428 for reading from and writing to removable optical disks 432, and/or a magnetic disk drive 430 for reading from and writing to magnetic disks 434. The optical disk 432 can be a CD-ROM, while the magnetic disk 434 can be a magnetic floppy disk or diskette. The hard disk drive 424, optical disk drive 428 and magnetic disk drive 430 may communicate with the processing unit 412 via the system bus 416. The hard disk drive 424, optical disk drive 428 and magnetic disk drive 430 may include interfaces or controllers (not shown) coupled between such drives and the system bus 416, as is known by those skilled in the relevant art. The drives 424, 428 and 430, and their associated computer-readable media 426, 432, 434, provide nontransitory nonvolatile storage of computer-readable instructions, data structures, program modules and other data for the CAD/CAM system 402. Although the depicted CAD/CAM system 402 is illustrated employing a hard disk 424, optical disk 428 and magnetic disk 430, those skilled in the relevant art will appreciate that other types of computer-readable media that can store data accessible by a computer may be employed, such as WORM drives, RAID drives, magnetic cassettes, flash memory cards, digital video disks ("DVD"), RAMs, ROMs, smart cards, etc.

Program modules can be stored in the system memory 414, such as an operating system 436, one or more application programs 438, other programs or modules 440 and program data 442. The application programs 438 may include instructions that cause the processor(s) 412 to implement the CAD application and CAM application shown in FIG. 3, for example. These various aspects are described in detail herein with reference to the various flow diagrams.

The system memory 414 may also include communications programs, for example, a server 444 that causes the CAD/CAM system 402 to serve electronic information or files via the Internet, intranets, extranets, telecommunications networks, or other networks. The server 444 in the depicted implementation is markup language based, such as Hypertext Markup Language (HTML), Extensible Markup Language (XML) or Wireless Markup Language (WML), and operates with markup languages that use syntactically delimited characters added to the data of a document to represent the structure of the document. A number of suitable servers may be commercially available such as those from Mozilla, Google, Microsoft and Apple Computer.

While shown in FIG. 4 as being stored in the system memory 414, the operating system 436, application programs 438, other programs/modules 440, program data 442 and server 444 can be stored on the hard disk 426 of the hard disk drive 424, the optical disk 432 of the optical disk drive 428 and/or the magnetic disk 434 of the magnetic disk drive 430.

An operator can enter commands and information into the CAD/CAM system 402 through input devices such as a touch screen or keyboard 446 and/or a pointing device such as a mouse 448, imager 466 and/or via a graphical user interface. Other input devices can include a microphone, joystick, game pad, tablet, scanner, etc. These and other input devices are connected to one or more of the processing units 412 through an interface 450 such as a serial port interface that couples to the system bus 416, although other interfaces such as a parallel port, a game port or a wireless interface or a universal serial bus ("USB") can be used. A monitor 452 or other display device is coupled to the system bus 416 via a video interface 454, such as a video adapter. The CAD/CAM system 402 can include other output devices, such as speakers, printers, etc.

The CAD/CAM system 402 can include one or more network interfaces 460 and/or one or more modems 461 (e.g., DSL modem, cable modem), and can operate in the networked environment 400 using logical connections 410 to one or more remote computers and/or devices. For example, the CAD/CAM system 402 can operate in a networked environment using logical connections 410 to the controller of the waterjet apparatus (FIG. 3). Communications may be via a wired and/or wireless network 470, for instance, wired and wireless enterprise-wide computer networks, intranets, extranets, and/or the Internet. Other implementations may include other types of communications networks including telecommunications networks, cellular networks, paging networks, and other mobile networks. There may be any variety of computers, switching devices, routers, bridges, firewalls and other devices in the communications paths between the CAD/CAM system 402 and other client processor-based systems.

Figure 5:
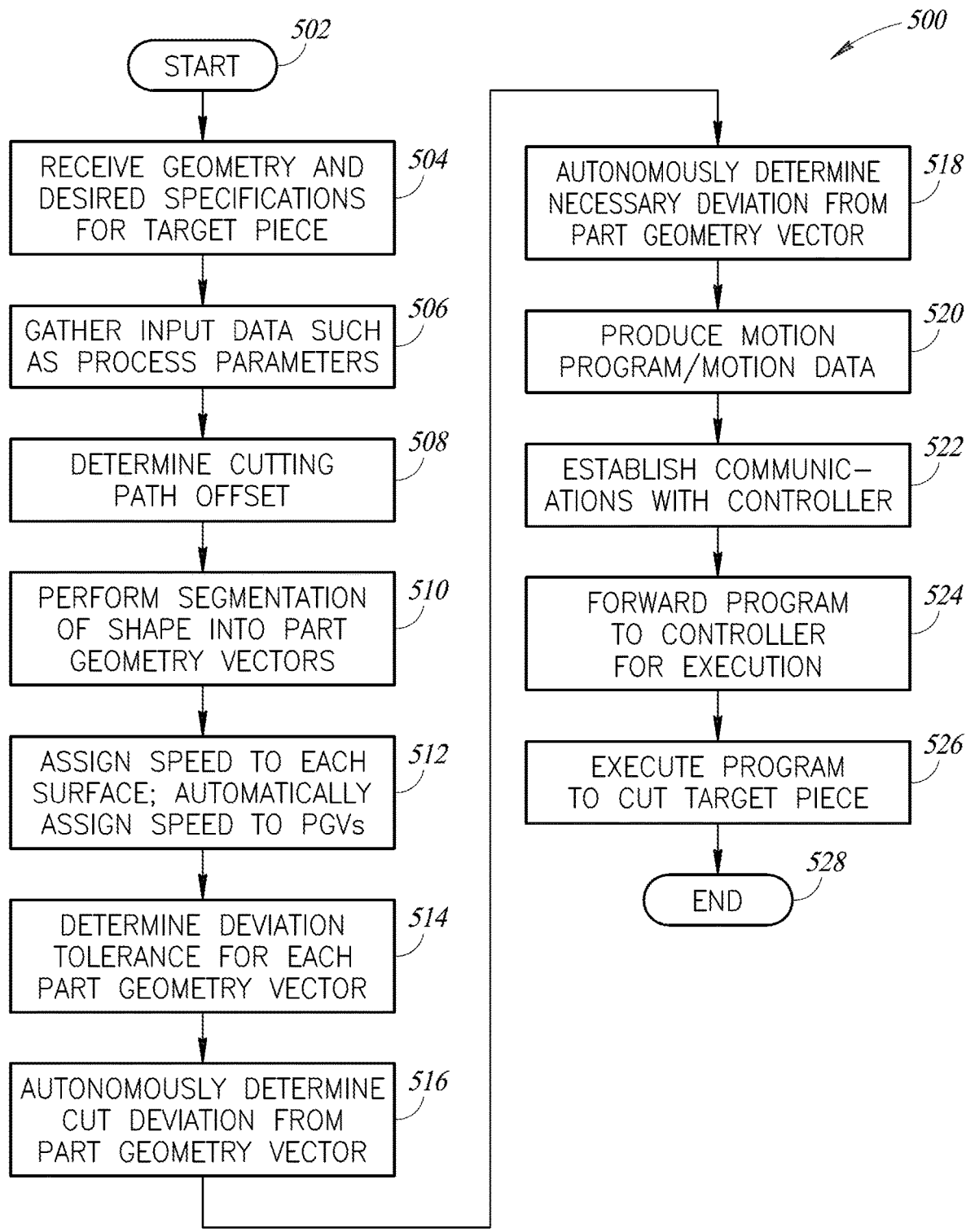
FIG. 5 is a flow diagram of logic executed by an example implementation of an Adaptive Vector Control System (AVCS) to produce a target piece, according to one illustrated implementation.

FIG. 5 is an example flow diagram of a method 500 executed by an example implementation of a CAD/CAM system or AVCS to produce a target piece. The method 500 begins at 502.

At 504, the AVCS gathers a variety of input data from the operator, such as from a CAD application (e.g., CAD application 304) running on a workstation (e.g., CAD/CAM system 300 of FIG. 3), including a design (a geometry specification) for a target piece in a three-dimensional CAD format, or equivalent. The geometry specification may describe a part formed by "ruled surfaces."

A ruled surface is typically described by a set of points swept by a moving straight line. Since an unobstructed waterjet will proceed in a straight line, a ruled surface gives a natural way to define a part that may be produced. Generally speaking, a non-ruled surface is more difficult to cut by a waterjet process. However, cutting a non-ruled surface can be made to approximate the cutting of a ruled surface by viewing the cutting thereof as cutting a series of smaller ruled surfaces. The more subdivided the non-ruled surface into smaller ruled surfaces, the more likely the resultant shape will approximate the intended shape. For example, cutting a spherical surface can be approximated by cutting a multitude of smaller polygon flat surfaces; the more polygons cut, the more the resultant shape looks round. Also, it is possible to cut (remove) a ruled surface from a non-ruled workpiece.

In addition, other customer requirements can be specified and gathered, such as dimensional tolerances, and an indication of the surface finish (and/or desired quality and/or acceptable speed). In at least some implementations, these input specifications may be supplied by a GUI, such as the user interface 322 of FIG. 3, by using tools that allow users to assign tolerances and/or indications of desired finish to particular regions of (areas and/or surfaces of) the target piece, for example, through standard or proprietary user interface controls such as buttons, edit fields, drop downs or a direct manipulation interface that incorporates drag-drop techniques. Dimensional tolerances may, for example, be indicated by a numerical input or some alternative scale. For example, scales that indicate relative accuracy can be used such as "tight tolerance" "standard tolerance," and "loose tolerance." Additionally, the whole part need not be assigned the same dimensional tolerance. For example, a mating surface may be defined as requiring higher precision than other less critical surfaces. Part tolerance is frequently traded off with surface finish with rougher surfaces creating less dimensionally accurate parts. In cases where the dimensional tolerance opposes the surface finish, the more stringent requirement of the two typically is used by the AVCS. For example, a part allowing a "loose tolerance" but a "fine finish" will be assigned the "fine finish" requirement. In addition, other indications of surface finish may be used such as a degree or a scale of desired quality and/or relative speed, where for example, 100% is equivalent to the fastest possible speed for that portion (e.g., a region of the part) and, for example, 50% is indicative of a finer finish. Other scales for indicating surface finish or the quality of the cut can be used, for example, indications of quality such as "rough finish," "medium finish," and "smooth finish." As well, default values may be supplied by the AVCS as well as a single value for the entire part.

At 506, the AVCS gathers other input data, such as process parameters, typically from an operator, although these parameters may have default values or some may be able to be queried and obtained from the jet apparatus controller. In one example implementation, the AVCS determines values for one or more of the type of material being cut; material thickness; fluid pressure; nozzle orifice diameter; abrasive flow rate; abrasive type; offset distance; mixing tube diameter; and mixing tube length (or other mixing tube characteristics) as process parameters. As discussed further below with reference to FIGS. 6-9, in some implementations one or more process parameters are measured in real-time and provided to the controller (e.g., controller 320 of FIG. 3) to dynamically tune one or more cutting models in real-time.

At 508, the AVCS uses the received geometry specification and input process parameters to automatically calculate an offset geometry. The offset geometry is the geometry that needs to be followed when the target piece is cut to account for any width that the jet actually takes up (the width of the cut/kerf due to the jet). This prevents the production of pieces that are smaller or larger than specified. As characteristics of the jet change over time, for example, due to wear, jet process parameters need to be correspondingly modified in order to compute the correct offset. In some implementations, the size of the offset is fixed and part of the input data. Calculation of the offset geometry for a three-dimensional part may be achieved using known techniques for offsetting surfaces. Alternatively, an approximation of the offset geometry instead of direct calculation may be obtained by computing an offset from the jet entry contour (the contour of the part where the jet enters the material) and computing an offset from the jet exit contour (the contour of the part where the jet exits the material) and then connecting the entrance and exit contours by lines. Depending on the inclinations of the surfaces and allowed tolerances, this approximation methodology may or may not be acceptable.

Acts 510-520 generate a motion program by incrementally storing determined program values in a motion program structure (or other data structure, as needed by a particular cutting head controller, cutting head, etc.). In at least some implementations, the entries in the data structure correspond to stored motion program instructions and/or data that are executed by the controller. Depending upon the particular cutting head apparatus and controller, the motion program may be motion instructions and/or data, fed directly or indirectly to the hardware/software/firmware that controls the cutting head. In addition, some configurations require inverse kinematic data because the instructions are specified from the point of view of the motors in the cutting head instead of from the point of view of the jet. Inverse kinematics can be computed using known mathematics to convert jet coordinates into motor (or sometimes referred to as joint) commands. All such implementations can be incorporated into an AVCS appropriately configured to use the techniques described herein.

In particular, at 510, the offset geometry is segmented into a number of part geometry vectors (PGVs). This segmentation is performed, for example, automatically by components of the AVCS, or, in some implementations, may be performed externally, such as by a CAD/CAM program. Information from the part geometry specification and offset geometry is used to determine the jet entrance contour where the cutting jet will enter the target material as it progresses along the desired cutting path, and the jet exit contour where the cutting jet will leave the material accordingly. For example, when cutting a part from flat stock, the jet entrance contour will define the cutting path on the top of the part and the jet exit contour will define the cutting path on the bottom of the part. The PGVs then are formed by using multiple lines to connect the jet entrance contour to the jet exit contour in a one to one relationship. That is, there are an equal number of segments between PGVs in both the entrance and exit contours. In at least one example implementation, the end points of each PGV are connected by lines to each succeeding PGV along the contour. In at least one implementation, the number of PGVs is determined by the desired resolution of the target part to be cut. Other factors such as the hardware kinematics or motion controller capabilities may also be considered when determining the number of required PGVs. Additionally, lead-in and lead-out PGVs may be added to the offset geometry (or beforehand to the geometry specified by the user) to correspond to start and finishing positions of the jet. These vectors do not define the part, but describe the way the jet starts and ends its cut into the workpiece.

At 512, an indication of maximum cutting speed allowed is assigned to one or more surfaces or regions of the desired part. Typically, the operator (or using a default provided by the AVCS) assigns a maximum speed to each region/surface of the target part, a set of regions, or the whole part, either as an indication of speed or by specifying surface finish and/or quality, etc. Defining the maximum speed allowed sets an upper limit on how rough the surface finish of the cut will be. Cutting speed and surface finish are tightly related; thus, the indication of maximum speed allowed may take the form of any scale representing cutting speed, surface finish, or cut quality. Using the input data, process parameters, received geometry specification, indication of speed, and any required mathematical relationships, the AVCS then automatically calculates the desired tool tip speed along the jet entrance contour for each segment (between PGVs) based upon the indicated maximum cutting speed assigned to each respective surface/region. In the case where the length of a segment on the entrance contour and corresponding segment on the exit contour are different, the cutting speed will vary along the length (projection into the material) of the jet (because more material needs to be cut on one contour than the other in a given period of time). Thus, the AVCS needs to adjust the cutting speed at jet entrance such that no portion of a given surface is cut at a speed greater than the indicated maximum allowed speed. This means that the cutting speeds along some portions of the jet (hence assigned to the PGV) may be conservative to insure that all regions (surface areas) bounded by PGVs do not violate the quality requirement (e.g., are within the desired maximum speed). An example using a percent of maximum speed as a suitable indication of maximum speed is available in Flow-Master™ controlled shape cutting systems, currently manufactured by Flow International Corporation. Equivalent indicators of surface finish, speed, and/or quality are generally known. When using percent of maximum speed as the indicator, predictive models, equations, and/or equivalent look-up tables, such as the speed and acceleration model 330, can be used by the AVCS to determine the fastest cutting speed possible for a given thickness of material based on the input data (for example, to comport with Newtonian constraints). The percentage value is then used to scale the calculated maximum value.

At 512, the determination of speed is made for each top/bottom pair of segments bounded by adjacent PGVs. Given the lengths of the top and bottom segments and an indication of speed, the AVCS automatically calculates both the top and bottom cutting speeds.

At 514, the tolerance input data from act 504 are used to determine an enclosed (imaginary) volume around each PGV. This volume represents the deviation tolerance (or deviation tolerance zone) for each PGV. In practice, the tolerance requirements may be directional in nature. For example, as the jet is directed into an inside corner, it may be undesirable to create a region of overcutting into the part. On an outside corner, however, cutting into the waste material by the trailing jet may be acceptable. These different requirements may result in one tolerance value as the jet goes into the corner and another tolerance value as the jet leaves the corner. Such requirements might create tolerance volumes of varying sizes and shapes throughout a part. In addition, a single tolerance value may be assigned to the entire part, for example, when less precision of any subparts of the part is required. Also, one or more tolerances may be assigned by the cutting system, for example, as default values.

At 516, the AVCS automatically determines the shape of the part to be cut and whether or not the shape is within the deviation tolerance associated with each PGV. In at least one implementation, the indication of maximum allowed speed, input data, received geometry specification, and part geometry vectors are used to predict the shape of the cutting front (the cut down the length of the jet) as it moves into the workpiece material to cut the target piece.

At 518, the AVCS automatically determines two deviation correction angles applied relative to the XYZ-coordinate system used to describe the PGV. Here, the deviation correction angles may be expressed as spherical coordinates applied to the local coordinate system of the PGV. Other equivalent expressions may be used. Also, depending upon the cutting head apparatus motors and controller, fewer or more deviation angles may be determined and used. The deviation correction angles are used to create a new jet direction vector (JDV) that deviates from the PGV in the amount defined by the tilt and swivel specified in the deviation correction angles. In the case where the predicted shape of the cutting front is outside of the deviation tolerance volume, directing the jet along the JDV will adjust the cutting front into the deviation tolerance volume.

At 520, the AVCS builds the final motion program/data by making adjustments to the motion program data structure (or other data structures) as necessary for the particular jet controller in use. The motion program contains the necessary commands to orient the jet along each JDV at the determined cutting speed, starting with the location of the lead-in JDV and ending with the location that corresponds to the lead-out JDV, as the jet progress along the entrance and exit contours. The motion program instructions may be expressed in terms of motor positions or tool-tip positions and orientations, or equivalents thereof. If tool-tip positions defining location and orientation are used, the controller must interpret the instructions into motor positions through the use of kinematic equations. The complexity of the kinematics is typically a function of the hardware used to manipulate the cutting jet.

For example, some controllers are capable of receiving motion programs specified in terms of the jet orientation and internally use inverse kinematics to determine the actual motor positions from the jet tool tip positions. Others, however, expect to receive the motion program instructions in terms of motor positions, and not jet tool tip x-y positions and angle coordinates. In this case, when the jet tool tip positions need to be "translated" to motor positions, the AVCS in act 520 performs such translations using kinematic equations and makes adjustments to the orientation parameter values stored in the motion program data structure.

At 522, the AVCS establishes and/or verifies communication with the controller (e.g., controller 320 of FIG. 3) of the jet apparatus depending upon the setup of the connection between the AVCS and the controller. For example, in the case of an embedded AVCS, this logic may not need to be performed.

At 524, the AVCS sends (forwards, communicates, transmits, or the like) the built motion program/motion instructions/data to the controller for execution. The term "controller" includes any device/software/firmware capable of directing motor movement based upon the motion program/motion instructions/data. The term "motion program" is used herein to indicate a set of instructions that the particular jet apparatus and/or controller being used understands, as explained elsewhere. The foregoing code/logic can accordingly be altered to accommodate the needs of any such instructions and or data requirements.

After the AVCS has finished building the motion program and establishing communication with the jet apparatus controller, the cutting module user interface may display the controller feedback and control dialog (the "controller dialog") for actually running the cutting process.

At 526, the controller executes the motion program to cut the target piece. As the controller advances through the motion program, it smoothly transitions between all angles and speeds. As discussed below with reference to FIGS. 6-9, during execution of the motion program the controller may receive data indicative of one or more process parameters, and use such data to modify one or more of the predictive cutting models in real-time to account for the actual (versus expected) value of the one or more process parameters throughout the cutting process. Such allows for more accurate cutting in cases where the one or more process parameters are different than expected or vary during the cutting process.

The method 500 ends at 528.

As discussed above, dynamic waterjet cutting models may be dependent on multiple process parameters, such as supply pressure, abrasive mass flow rate, force of the waterjet on the target piece, etc. If these values vary during the process of cutting, the corrective dynamic waterjet models (discussed above) may apply an inaccurate correction. For example, the models may apply an inaccurate correction for taper as a function of speed along a cutting path. These process parameters may be directly measured by a sensor or transducer (e.g., sensors 338 of FIG. 3) communicatively coupled to a controller (e.g., controller 320) and/or an AVCS (e.g., CAD/CAM system 300 of FIG. 3).

Generally, the controller of a waterjet or other cutting system may include an interface or module (e.g., the interface or module 331 of the controller 320) which receives the sensor data during a cutting process, which allows for real-time (e.g., on the order of 10 ms, 20 ms) accounting of variations of one or more sensed or measured process parameters. This interface or module provides the capability to adjust or refine the models "on the fly," thus allowing the measured process parameters to be directly fed into real-time corrective models for dynamic waterjet/corner control. Such feature also has the benefit of reducing the potential for user error during entry of the operating parameters.

Figure 6:
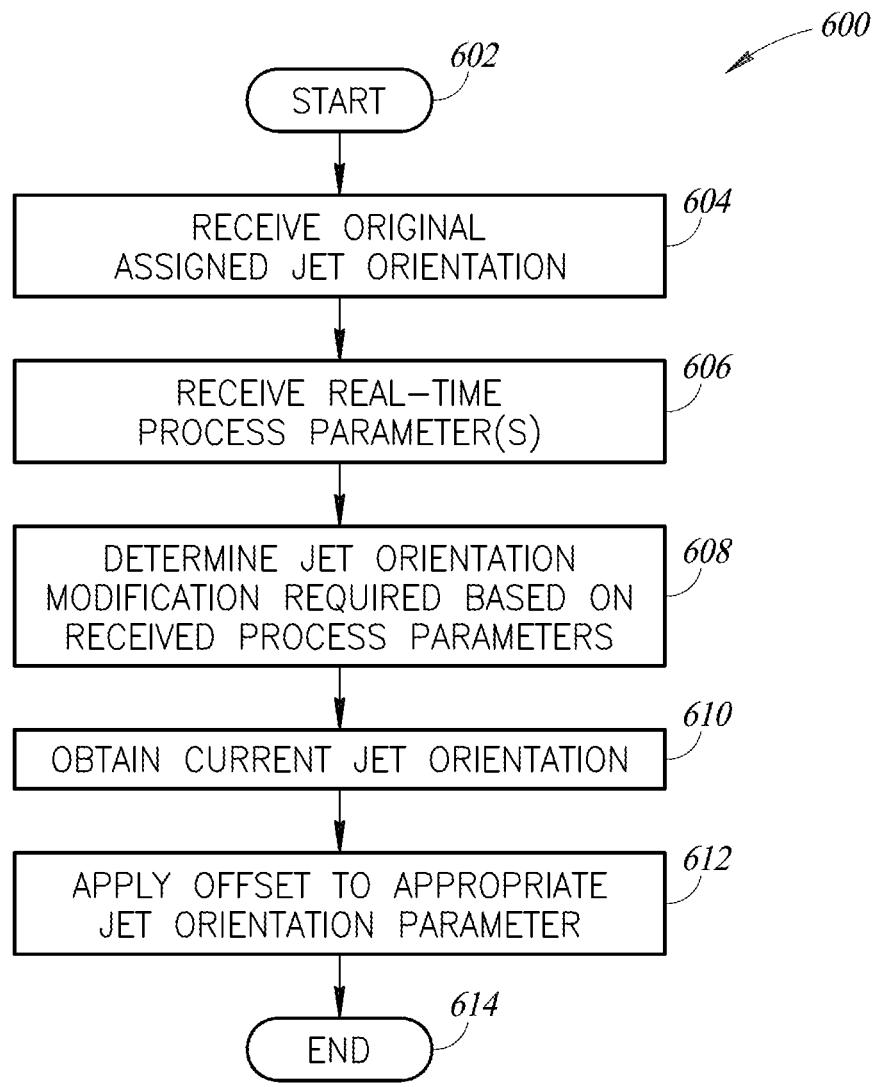
FIG. 6 is a flow diagram of a method of operating a controller to modify a dynamic waterjet model in real-time, according to one illustrated implementation.

FIG. 6 shows a flow diagram of a method 600 of operating a controller to modify a dynamic waterjet model in real-time to provide real-time adjustment of jet orientation. The method 600 begins at 602.

In typical flat-stock processes, taper compensation may be achieved by matching lead and taper angles to a given cutting speed. The orientation of the cutting jet is therefore changed as a function of the cutting speed. The jet orientation may be assigned by means of motion program parameters which are in turn interpreted by inverse kinematic functions located on-board the motion controller, as discussed above. Alternatively, explicit motor positions may be programmed based on the inverse kinematics of the system. In both such cases, the jet orientation may be calculated before the actual cutting process begins based on the anticipated cutting parameters.

As discussed above, in at least some of the implementations discussed herein, sensors are used to determine in real-time the state of one or more process parameters, such as abrasive mass flow rate and water pressure. If, at any time during the cut, the sensors indicate the process parameters have changed (e.g., by a threshold amount), the taper correction, surface finish and part accuracy may be adversely affected. In the case where the surface finish may still be acceptable but the taper compensation and part accuracy may not be acceptable, it may be possible to adjust the jet orientation in real-time, as discussed below.

At 604, the controller receives the original assigned orientation for the jet of a fluid jet apparatus. At 606, the controller receives one or more real-time process parameters from one or more sensors. For example, the controller may receive measurements for supply pressure and/or abrasive flow rate from one or more sensors. At 608, the controller determines a modification to the jet orientation based at least in part on the received measured process parameters. At 610, the controller may obtain the current orientation of the jet. At 612, the controller may apply an offset to the appropriate jet orientation parameter to correct the jet orientation based on the received measured process parameters.

The method 600 ends at 614. In the case where the method 600 is implemented using on-board inverse kinematics, the desired lead and taper angles are part of the motion program, which helps achieve acts 604, 608 and 610.

Figure 7:
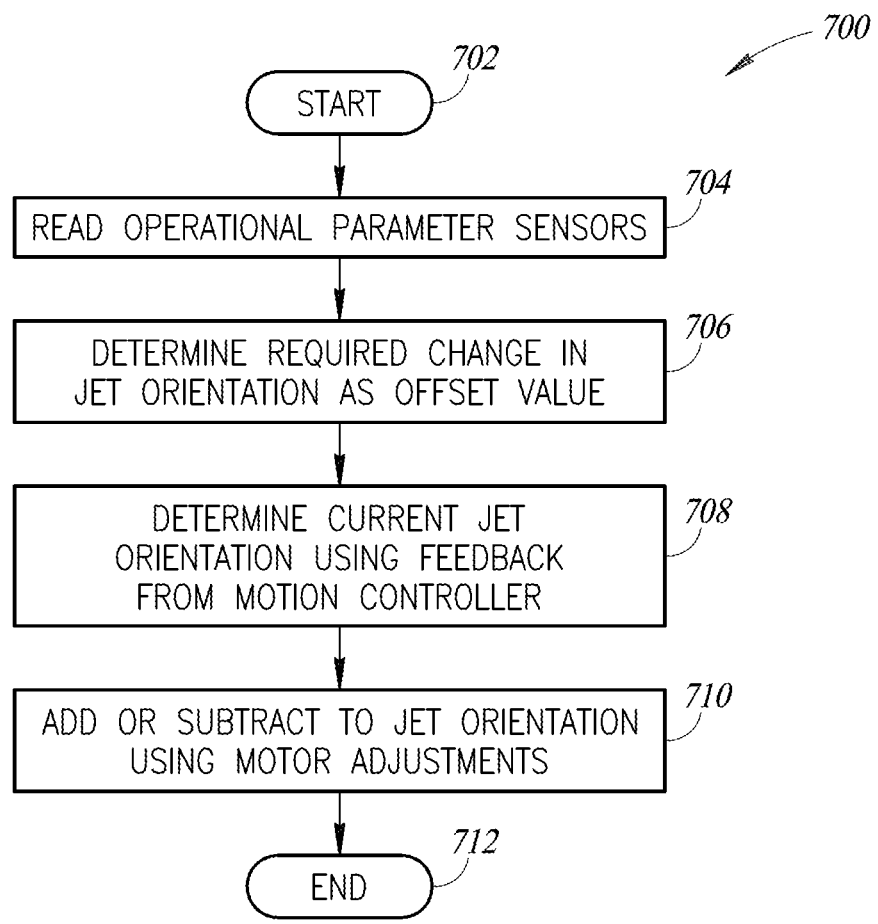
FIG. 7 is a flow diagram of a method of operating a controller to provide real-time adjustment of jet orientation for a waterjet cutting system, according to one illustrated implementation.

FIG. 7 is a flow diagram of a method of operating a controller to provide real-time adjustment of jet orientation for a waterjet cutting system which includes on-board inverse kinematics capabilities. The method begins at 702.

At 704, the controller may read the operational parameters data from one or more operational parameter sensors (e.g., sensor 338 of FIG. 3). At 706, the controller may determine (e.g., calculate) the required change in the jet orientation as an offset value. At 708, the controller may determine the current orientation of the jet using feedback (e.g., position feedback) from the motion controller. At 710, the controller may add or subtract to the jet orientation using motor adjustments, e.g., using phantom axes or real-time axes to accomplish this act.

When explicit joint commands are used instead of inverse kinematics, the controller may determine the jet orientation using knowledge of the forward kinematics. For flat-stock cutting of parts which have only vertical walls (i.e., no bevels), the controller may assume that any jet orientations different from the vertical are due to taper compensation or process models. Any adjustments to motor offsets may be run through a separate inverse kinematics model.

For parts which have non-vertical cuts (e.g., flat stock or non-flat stock parts with bevels), explicit joint commands may be used. However, the controller may not assume that any jet orientation changes are due to taper compensation or process models. Rather, in this case, the controller may add additional information to the motion program for access during real-time. Such information may be supplied using variable assignments, for example.

Figure 8:
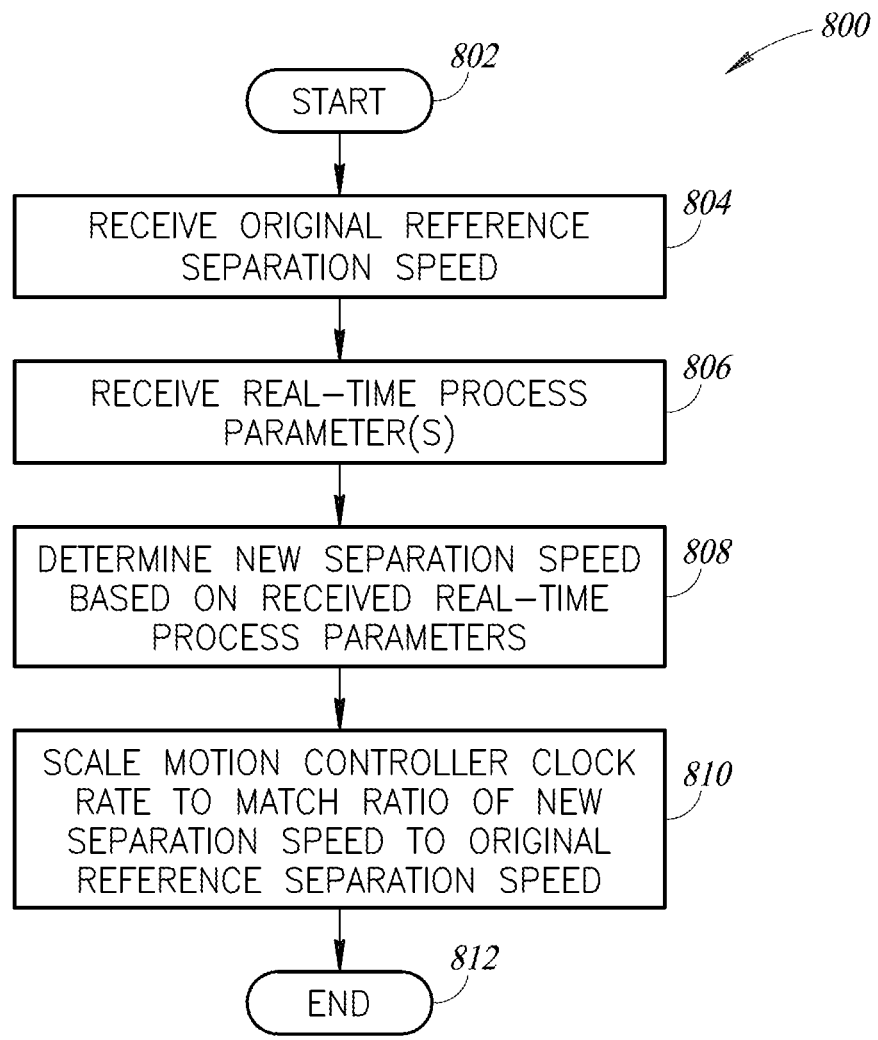
FIG. 8 is a flow diagram of a method of operating a controller to adjust a clock thereof in real-time responsive to changing operating parameters, according to one illustrated implementation.

FIG. 8 shows a flow diagram of a method 800 of operating a controller to adjust a clock thereof in real-time responsive to changing operating parameters. For example, method 800 may be implemented by controlling a clock 333 of the controller 320 of FIG. 3. The method 800 begins at 802.

In at least some implementations, compensation models, such as taper compensation models, may rely heavily on the concept of "separation cut speed," which is the fastest speed that the jet travels in order to reliably produce separation of part. Taper and lead angles may be considered functions of the percent speed of the cut, wherein the separation cut speed is related to a 100 percent speed. This methodology has significant ramifications with regard to real-time adjustment due to changing cutting process parameters.

If jet orientation parameters are based on percent speed, it is only necessary to determine how the measured process parameters affect the percent speed. Then, the clock cycle of the motion controller may be adjusted appropriately. This is so because changing the clock rate of the motion controller keeps the motion of all axes synchronized while adjusting the cutting speed. That is, there is no need to adjust the jet orientation because the cutting speed adjustment keeps all (pre-determined) corrections valid.

At 804, the controller receives an original reference separation speed (e.g., 100% separation speed, 80% separation speed) for a cutting process. As discussed above, the original reference separation speed may be based on one or more process parameters input by the user or set by the AVCS. At 806, the controller may receive one or more process parameters in real-time before and/or during execution of the cutting process.

At 808, the controller may determine (e.g., calculate) a new separation speed based at least in part on the real-time parameter feedback received from the one or more sensors. At 810, the controller may scale the motion controller clock rate to match the ratio of the new separation speed to the old reference separation speed. For example, if the new separation speed is 70% of the original reference separation speed, the motion controller clock rate may be adjusted to a new clock rate which is 70% of an original clock rate. As another example, suppose the separation speed for one set of conditions is 100 inches per minute (ipm). However, it is chosen to cut a part at 50 ipm for a better surface finish. 50 ipm may be used as a reference separation speed that is 50% the actual separation speed. Suppose the abrasive flow rate drops and the new separation speed is 80 ipm instead of 100 ipm. We now need to slow the clock down so that we cut at 40 ipm, which is the same percent reduction to the original reference separation speed of 50 ipm. In this example, the separation cut speed was used as a reference, but the part was not actually cut at either the original separation speed (i.e., 100 ipm) or the modified separation speed (i.e., 80 ipm).

As noted above, such feature allows for adjusting the speed of the cutting process in real-time based on operational parameter feedback without having to adjust the jet orientation because the cutting speed adjustment keeps all corrections valid.

The method 800 ends at 812.

Figure 9:
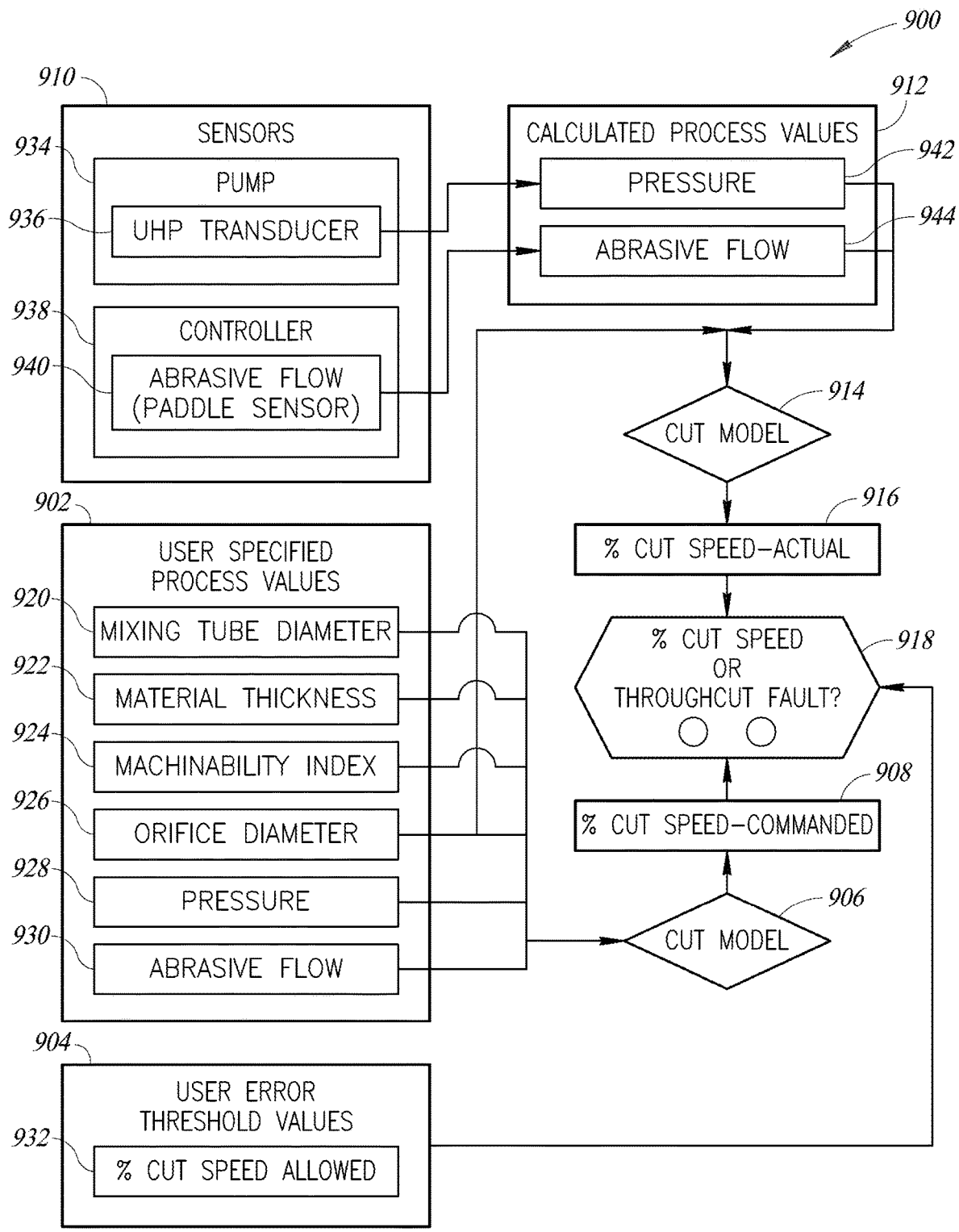
FIG. 9 is a flow diagram of a method of operating a controller to issue system warnings and/or shutdowns based on real-time sensing of one or more operating parameters, according to one illustrated implementation.

FIG. 9 shows a flow diagram of a method 900 of operating a controller to issue system warnings and/or shutdowns based on real-time sensing of one or more operating parameters. As discussed above, the application of beam cutting models, such as waterjet cutting models, may utilize inputs from the user to quantify certain cut quality (e.g., surface roughness). Additionally, certain system parameters (e.g., system pressure, abrasive flow rate) may be specified. Together, the system parameters and desired results may be used as inputs to a cutting model to dictate the commanded cutting speed of the beam (e.g., waterjet). By measuring the actual system or process parameters, the cutting models or algorithms may be used to determine (e.g., calculate) the actual cut quality being produced. By comparing the user's desired quality to the calculated, real-time quality, system warnings and/or shutdowns may be determined and implemented. Such features allow real-time verification of the cutting process, which improves efficiency and reduces or eliminates waste.

The features described herein provide advantages compared to using individual sensor thresholds. For example, whereas individual sensor readings may be used to issue warnings or shutdowns, it is possible that a combination of multiple sensor readings, while individually out of range, may nonetheless yield the intended cut quality. In such cases, it would be desirable to continue the cutting process rather than issuing a warning or shutting down the cutting process.

As shown in FIG. 9, a plurality of user specified process values 902 and user error threshold values 904 may be input into a cut model 906. The user specified process values 902 may include mixing tube diameter 920, material thickness 922, machinability index 924, orifice diameter 926, pressure 928, abrasive flow 930, and/or other process values. The user error threshold values may include a % cut speed allowed value 932 which is set by the user or provided by the AVCS (e.g., as a default or fixed value), and/or other user error threshold values.

At 908, the cut model 906 may be used to generate a commanded percent cut speed used to cut a target piece, as discussed above.

The system may receive sensor data from a plurality of sensors 910. For example, a pump 934 of a waterjet cutting apparatus may include an ultrahigh pressure (UHP) transducer 936 which measures the system pressure. Similarly, a controller may include an abrasive flow rate sensor 940 (e.g., paddle sensor).

At 912, during execution of a cutting process, the output of the sensors 910 may be used by the controller or other system to determine processes values or parameters which may be fed into a cut model 914. For example, the output of the UHP transducer 936 may provide a pressure value 942, and the output of the abrasive flow rate sensor 940 may provide an abrasive flow rate value 944, wherein the pressure value 942 and the abrasive flow rate value 944 are provided to the cut model 914.

At 916, the cut model 914 may be used to determine an actual percent cut speed used to cut a target piece based on the received measured process parameter values.

At 918, the actual cut speed may be compared to the commanded cut speed. Based on the comparison and the percent cut speed allowed 932 input by the user, the system may issue a warning and/or shutdown the cutting process. As an example, the warning may be provided via any user interface. The warning may be audible (e.g., beep, voice, siren), visual (e.g., flashing light(s), text, graphics), or any combination thereof. In the case where the cutting process is to be shut down, the system may issue an appropriate command to the controller to at least pause (e.g., temporarily pause, terminate) the cutting process. In at least some implementations, the user may be presented with a prompt to decide whether to continue or stop the cutting process.

Figure 10:
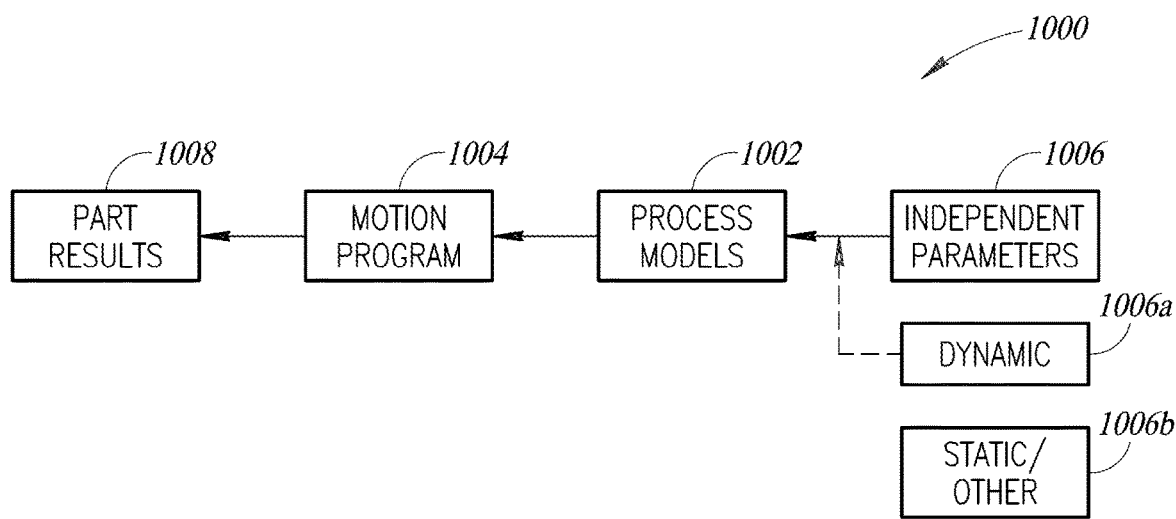
FIG. 10 is a flow diagram of a method of operating a fluid jet apparatus to cut a target object which utilizes real-time dynamic parameters to input into cutting process models for more accurate motion programs, according to one illustrated implementation.

FIG. 10 shows a flow diagram for a method 1000 of operating a fluid jet apparatus to cut a target object or part. The method 1000 may be implemented using the systems and methods discussed above with reference to FIGS. 3-9, for example.

As discussed above, a plurality of cutting process models 1002 may be used to generate a motion program 1004 which may be used by a fluid jet apparatus to cut a part or target object. The cutting process models 1002 may receive as input a number of independent parameters 1006 which may include static parameters 1006b and real-time dynamic parameters 1006a. During operation of a cutting process, a number of real-time dynamic parameters 1006a (e.g., pressure, abrasive flow rate) are input into the cutting process models 1002, which allows for generation of a more accurate motion program 1004 (e.g., a modified motion program). The motion program 1004 is used to control the cutting process to produce accurate parts or target objects 1008.

Figure 11:
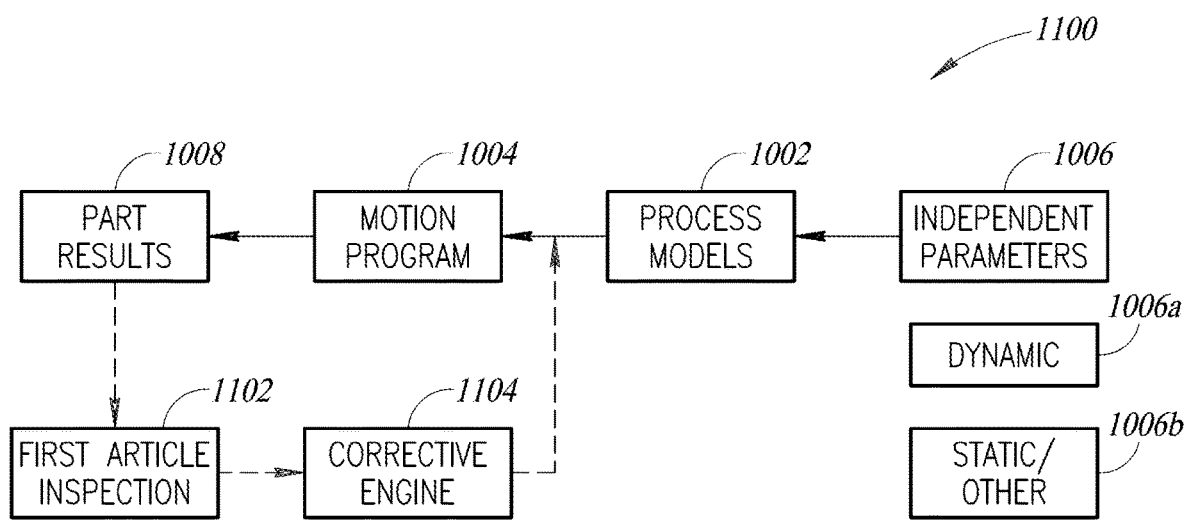
FIG. 11 is a flow diagram of a method of operating a fluid jet apparatus to cut a target object which utilizes an inspection device to identify errors in a first article and which automatically corrects a motion program using the inspection data, according to one illustrated implementation.

FIG. 11 shows a flow diagram for a method 1100 of operating a fluid jet apparatus to cut a target object or part. The method 1100 may be implemented using the systems and methods discussed above with reference to FIGS. 3-9, for example. The method 1100 is similar to the method 1000 of FIG. 10 in some aspects, so at least some of the discussion above is applicable to the method 1100.

In this implementation, the fluid jet apparatus is first controlled using the motion program 1004 and cutting process models 1002 to cut a first part 1008. Then, at 1102, the system inspects the first article to identify errors in the first article using one or more inspection devices (e.g., camera, probe, laser). For example, an inspection device may be positioned at an inspection station whereat the cut first article may be inspected. At 1104, a corrective engine may be provided to automatically modify/correct the motion program 1004, which modified motion program may then be used to cut a second part and subsequent parts more accurately.

As discussed above, modification of a motion program to generate a "modified motion program" may be achieved in several ways, for example, by modifying the moves of a motion program or by adding additional small moves thereto. Such moves may be done through kinematics routines or offsets to motor commands, for example. In at least some implementations, a motion program may be modified by modifying the original list of steps of motion program (e.g., move to modified point one, move to modified point two, etc.).

By utilizing an inspection device, also referred to herein as a part scanning or measurement device, accurate cutting path corrections may be automatically fed to the motion program without human interaction. The inspection device may be one or more of a number of suitable devices, such as two dimensional or three dimensional camera, a laser measurement system, calipers, coordinate measuring machine (CMM), a shadowgraph, etc., which may be operative to measure one or more attributes of a cut first article to identify cutting errors so that the motion program may be modified to compensate for such identified errors. In at least some implementations, the cutting and inspection acts may be an iterative processes that repeats for a number of parts, for example, until the cutting process is acceptable. Further, in at least some implementations, the cutting and inspection acts may be repeated periodically to ensure the cutting process continues to be accurate over time. As an example, the cutting and inspection acts may be repeated at a particular frequency (e.g., once per day, once per week), or may be repeated after a determine number (e.g., 10, 1000) of parts have been cut by the fluid jet apparatus.

In at least some implementations, the inspection device may measure a top surface of the cut first article and then the corrective engine 1104 may adjust the motion program 1004 to autonomously correct for measured errors in the XY plane. Further, in at least some implementations, the inspection device may measure multiple surfaces of the cut first article and the corrective engine 1104 may autonomously adjust the angle of the cutting tool to eliminate errors in one or more planes (e.g., vertical plane).

Figure 12:
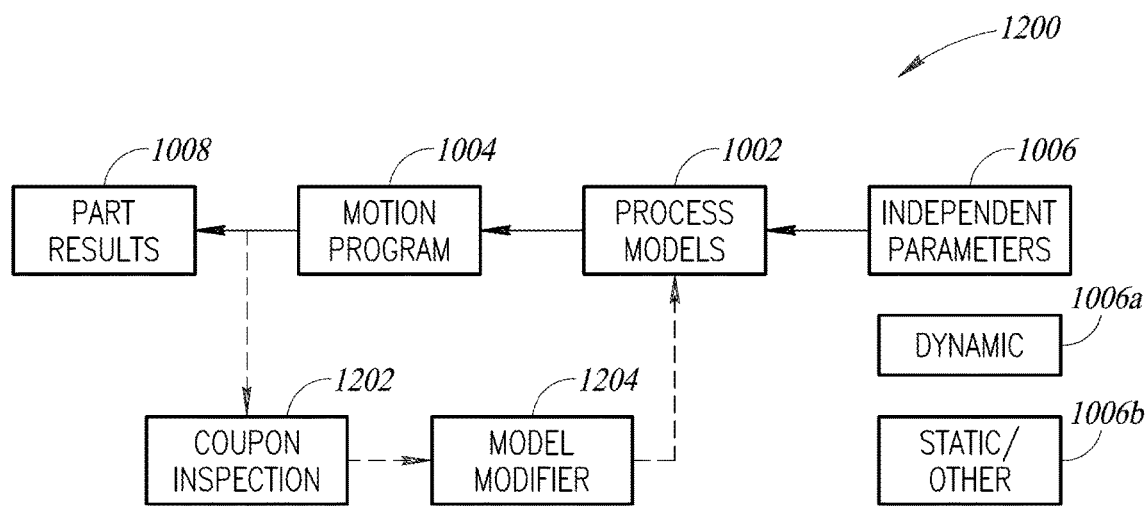
FIG. 12 is a flow diagram of a method of operating a fluid jet apparatus to cut a target object which utilizes an inspection device to inspect a cut of a coupon for one or more process attributes, and modifies or tunes cutting process models based on the inspection, according to one illustrated implementation.

FIG. 12 shows a flow diagram for a method 1200 of operating a fluid jet apparatus to cut a target object or part. The method 1200 may be implemented using the systems and methods discussed above with reference to FIGS. 3-9, for example. The method 1200 is similar to the methods 1000 and 1100 of FIGS. 10 and 11, respectively, so at least some of the discussion above is applicable to the method 1200.

In this implementation, the fluid jet apparatus is first controlled using the motion program 1004 and cutting process models 1002 to cut a coupon. The coupon may have similar attributes (e.g., type of material, thickness) to the material which is to be used to cut the target object. Then, at 1202, the system inspects the cut coupon for one or more process attributes (e.g., trailback amount, trailback profile, taper) using one or more inspection devices (e.g., camera, probe, laser). At 1204, a model modifier may be provided to automatically modify/tune the cutting process models 1002 based on the results of the inspection of the cut coupon, which modified cutting process models may be used to generate a motion program that may then be used to cut target parts more accurately. The method 1200 is discussed in further detail below with reference to FIGS. 14-19.

Figure 13:
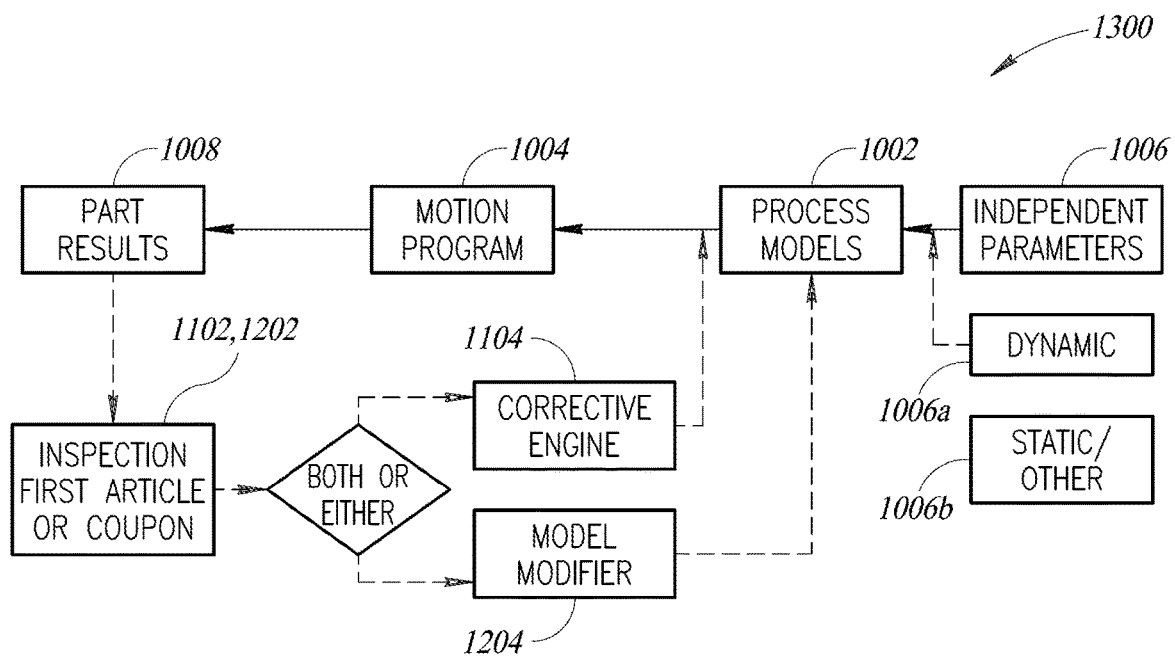
FIG. 13 is a flow diagram of a method of operating a fluid jet apparatus to cut a target object which combines the features of the methods shown in FIGS. 10, 11 and 12, according to one illustrated implementation.

FIG. 13 shows a flow diagram for a method 1300 which combines the functionality of the methods 1000, 1100 and 1200 of FIGS. 10, 11 and 12, respectively. As shown, the system may feed real-time dynamic parameters 1006*a* to the process models 1002 to modify the motion program to correct for such parameters. Further, the system may cut a coupon (e.g., from time-to-time as desired), inspect the same, and alter or tune the process models 1002 based on the inspection of the cut of the coupon. Additionally or alternatively, the system may first cut a first article or part, inspect the same, and then may utilize the corrective engine 1104 to modify the motion program 1004 based on the inspection data to produce more accurate parts.

Figure 14:
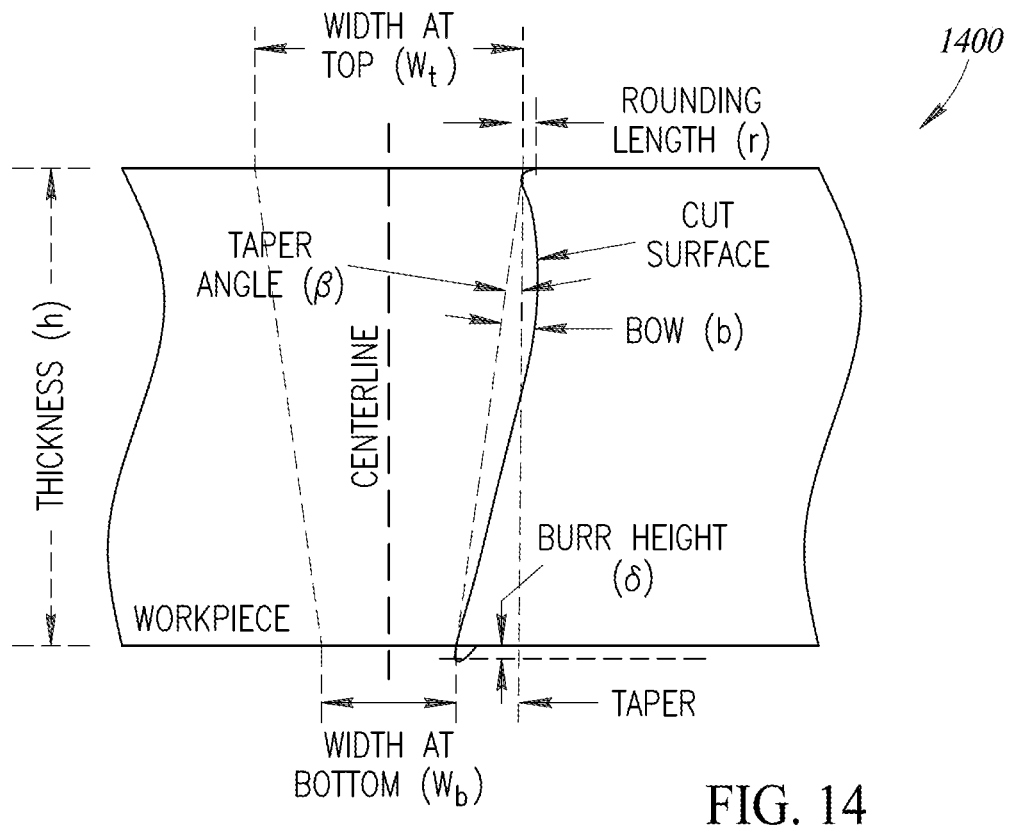
FIG. 14 is a diagram which shows various cut width attributes for a cut made by a fluid jet apparatus, according to one illustrated implementation.
Figure 15:
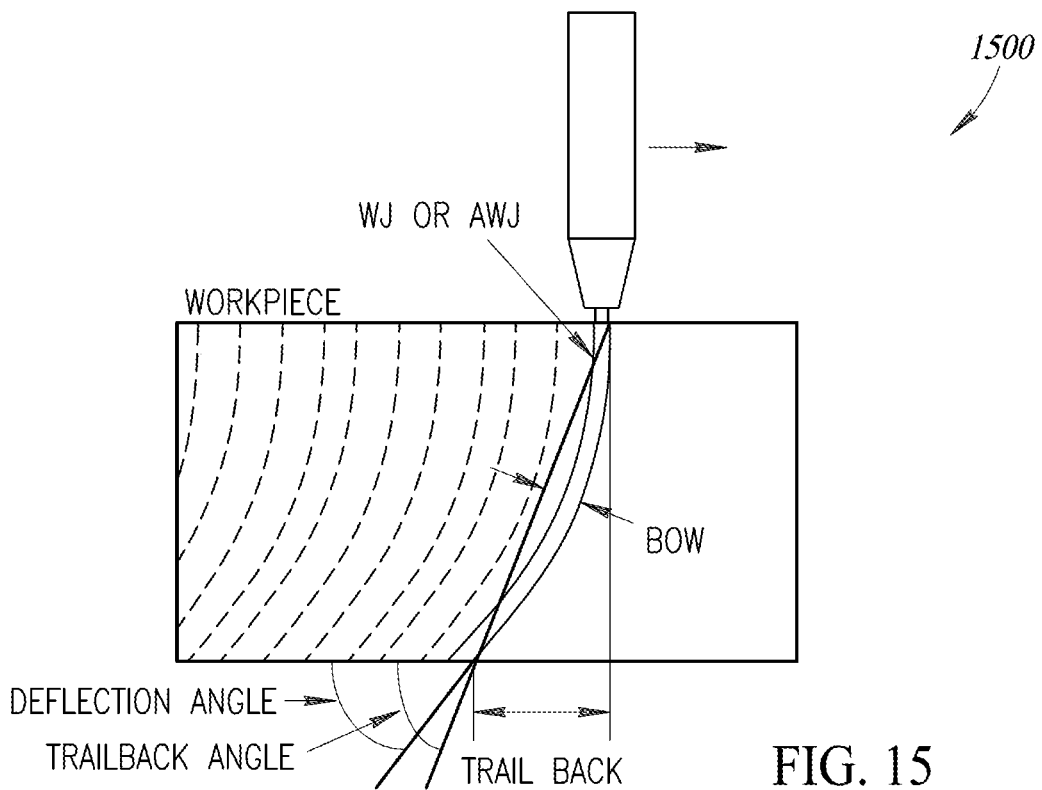
FIG. 15 is a diagram which shows various cut front attributes for a cut made by a fluid jet apparatus, according to one illustrated implementation.

FIGS. 14 and 15 show various attributes of cuts produced by a fluid jet apparatus, and associated definitions of terms used herein. In particular, FIG. 14 is a diagram 1400 which shows various cut width or "kerf width" attributes for a cut made by a fluid jet apparatus. Such attributes include thickness (h) of a part or workpiece to be cut, width of the cut at the top of the workpiece ($W_t$), width of the cut at the bottom of the workpiece ($W_b$), rounding length (r), taper angle ($\beta$), bow (b), burr height ($\delta$), and taper amount. FIG. 15 is a diagram 1500 which shows various cut front attributes for a cut made by a fluid jet apparatus. Such attributes include bow, deflection angle, trailback angle, and trailback amount.

According to at least some implementations of the present disclosure, a device and method are provided which inspect the kerf of a coupon which has been cut by the fluid jet apparatus prior to cutting target objects. In at least some implementations, the inspection device may inspect both the width and front profile of the cut in the coupon. The system may then autonomously utilize the inspection data received from the inspection device to correct or fine tune the cutting process models 1002 (see FIG. 12), for example, by modifying one or more coefficients of the cutting process models. In at least some implementations, the inspection data may be stored in at least one nontransitory processor-readable storage medium for future use in a similar situation or for use in adjusting the cutting process models for improved prediction capabilities.

The features discussed herein may be complimentary to utilizing prediction models where not all considerations have been accounted for. For example, when a mixing tube of a fluid jet apparatus wears out, the prediction provided by the cutting process models may not take into account the new shape of the worn mixing tube and its effect on taper, trailback amount, trailback profile, etc.

In at least some implementations, the inspection device performs the inspection of the cut of the coupon in at least two directions. In a first direction, the kerf width profile (see FIG. 14) may be inspected to determine kerf taper and "bow," if any. In a second direction, the cut front profile (see FIG. 15) may be inspected to determine the trailback amount and the trailback profile along the depth of the cut (i.e., thickness (h) of the coupon).

Figure 16:
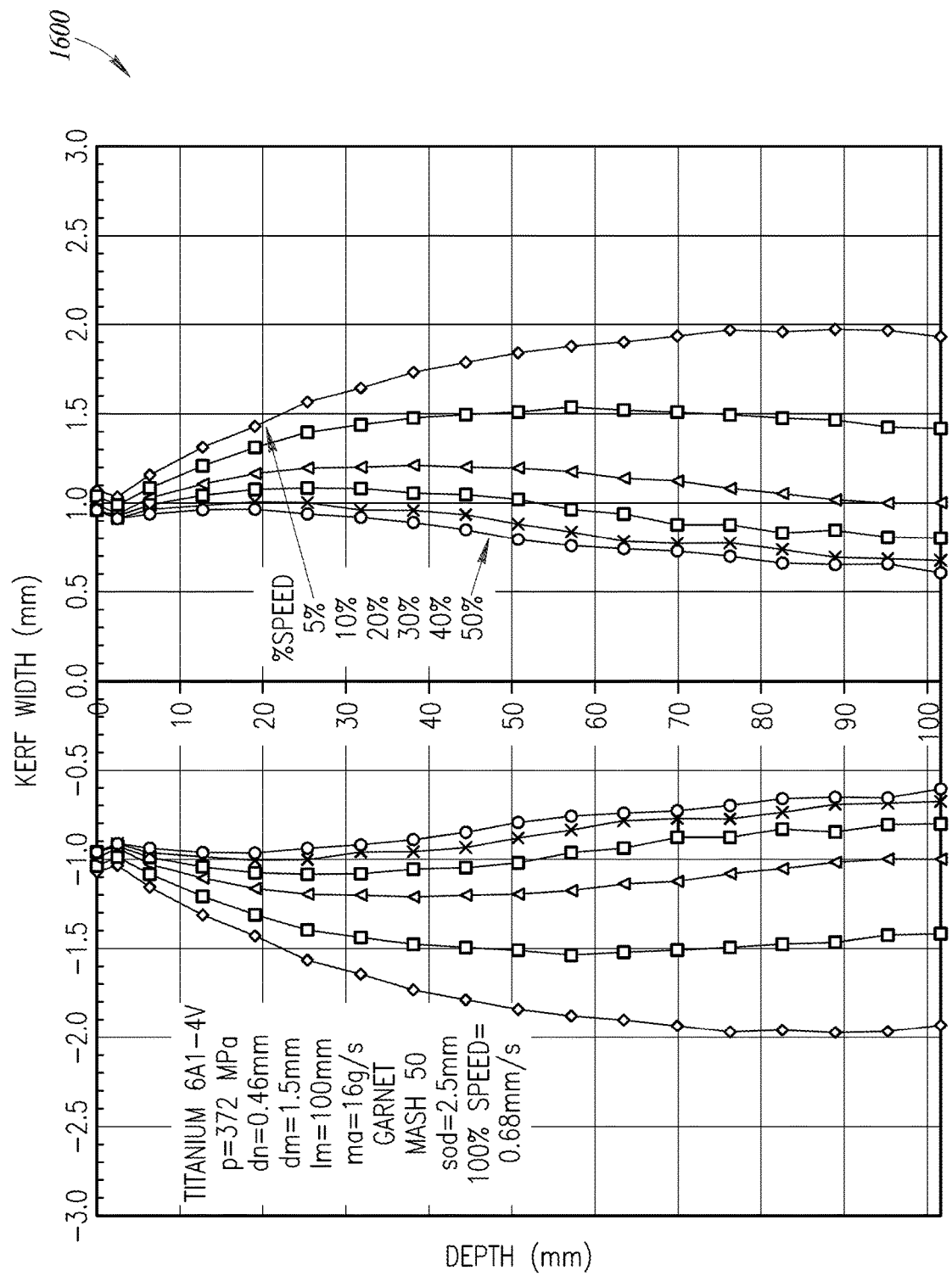
FIG. 16 is a plot of sample kerf width profiles for a number of cuts of a coupon, according to one illustrated implementation.

FIG. 16 shows a plot 1600 of sample kerf width profiles for a number of cuts of a coupon having a thickness (h) of 100 mm when cut at various percent cutting speeds of the fluid jet apparatus ranging from 5% cutting speed to 50% cutting speed. As shown, at relatively low cutting speeds (e.g., 5% cutting speed) the taper is divergent (negative), and at relatively high cutting speeds (e.g., 50% cutting speed) the taper is convergent (positive).

Figure 17:
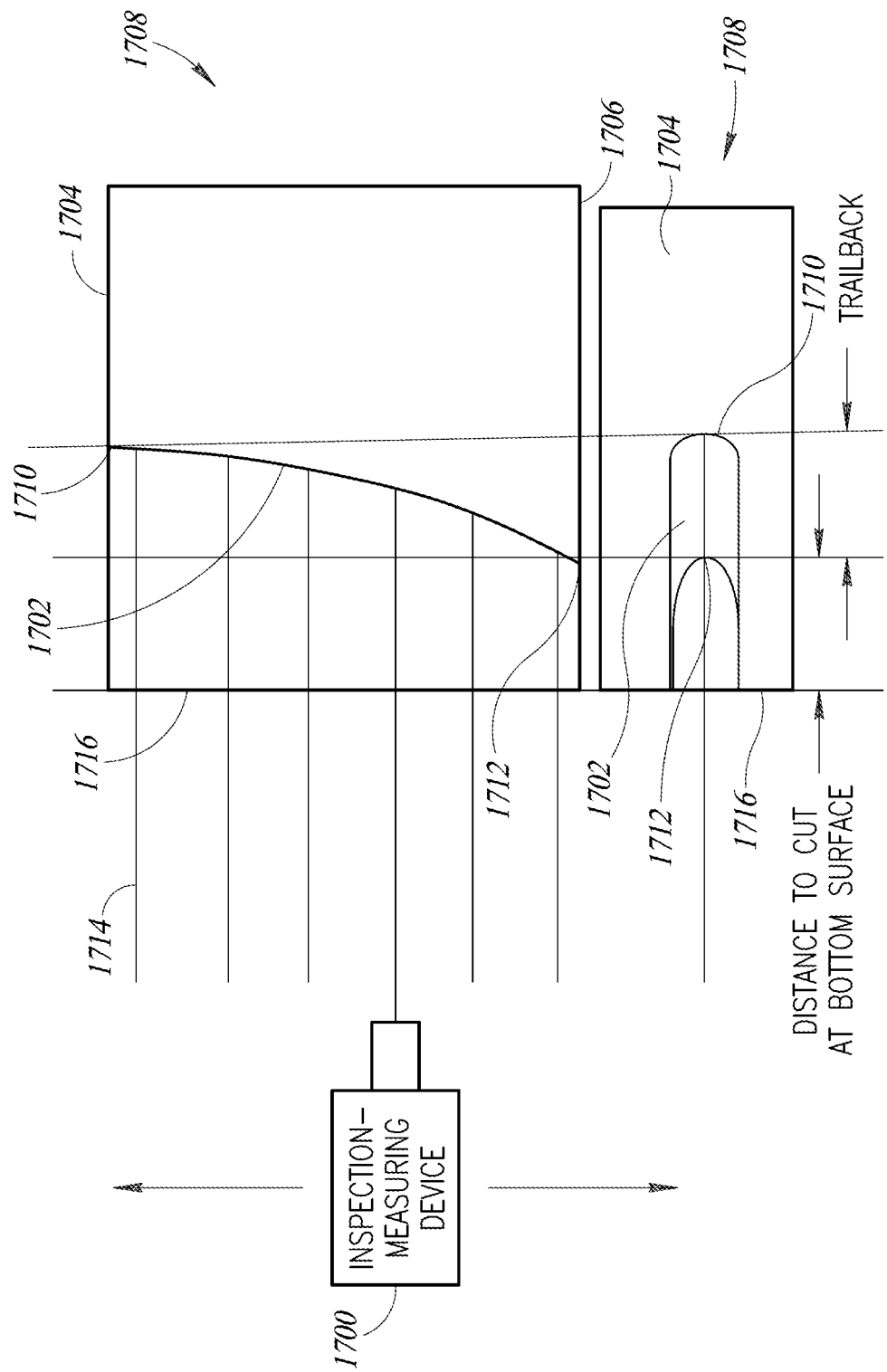
FIG. 17 shows an example of an inspection device which may be utilized to inspect a cut of a coupon, according to one illustrated implementation.

FIG. 17 shows an inspection device 1700 which may be used to inspect a side of a cut 1702 (top of FIG. 17) which extends between a top surface 1704 and a bottom surface 1706 of a coupon 1708 to measure a trailback profile and/or may inspect the top surface 1704 of the coupon 1708 to inspect the cut 1702 (bottom of FIG. 17) to detect total trailback amount. The cut 1702 includes an uppermost portion 1710 adjacent the top surface 1704 and a lowermost portion 1712 adjacent the bottom surface 1706. The inspection device 1700 may include a probe, vision camera, laser system, etc., to scan a "nibble" cut made on the edge of the coupon to determine various attributes of the cut (e.g., taper, trailback profile, trailback amount). Horizontal lines 1714 shown in FIG. 17 represent non-limiting example scanning increments for the inspection device 1700. For example, the inspection device 1700 may obtain a number (e.g., 2, 5, 10, 100) of scans of the cut 1702 at differing heights thereof. The inspection device 1700 may obtain scans from a front view of the cut 1702, as shown in the top of FIG. 17, and may also obtain scans of a top view of the cut, as shown in the bottom of FIG. 17. Alternatively or additionally, the inspection device 1700 may obtain one or more scans from other views of the cut 1702. Once acquired by the inspection device 1700, inspection data may be transmitted to at least one processor (e.g., controller) of the fluid jet apparatus control system to autonomously determine whether any parameters of one or more cutting processes models need to be modified to produce more accurate parts. For example, the at least one processor may autonomously determine a taper angle that needs to be applied at a selected speed based at least in part on the inspection data received from the inspection device 1700.

The selected (or predicted) cutting speed may be the one that achieves the required surface finish based on the cutting process models. The measured width profile may be used to determine the taper angle to either minimize wall deviation from straightness, considering the bow amount, or may simply be used to place the bottom of the cut under the top of the cut in the intended direction. In the latter case, bow may be ignored. As discussed further below, the process is similar for trailback compensation.

In at least some implementations, the inspection device 1700 also inspects the trailback profile of a cut of a coupon. In such cases, at least two approaches may be followed. In a first approach, the same nibble cut made to inspect the kerf width is scanned using a laser or a vision camera to determine the entire profile of the trailback curve. Accordingly, in such instances the nibble cut should be of short length into a front edge 1716 of the coupon 1708 to be accurately inspected by the inspection device. For example, in at least some implementations the length of cut may be long enough to allow the exit side (e.g., bottom surface 1706) of the jet to be into the material by a determined amount (e.g., 0.25 inches), as shown in FIG. 17 as the distance between the front edge 1716 of the coupon 1708 and the lowermost portion 1712 of the cut 1702 adjacent the bottom surface 1706. In at least some implementations, this length may initially be predicted using the initial cutting process models.

In a second approach, the total amount of trailback is measured. As shown in the bottom portion of FIG. 17, the total trailback amount is the difference between the length of the cut 1702 at the top surface 1704 and the length of the cut at the bottom surface 1706 from the front edge 1716 of the coupon 1708 as a reference. In this approach, the shape of the trailback curve is not considered.

At the end of the nibble cut, the jet should be stopped immediately. Otherwise, leaving the jet dwelling at the end of the cut may alter the shape of the trailback curve, causing the inspection of the cut to be inaccurate. In at least some implementations, the jet may be turned off at the end of the cut allowing a vacuum assist to prevent abrasive clogging after the jet turns off. Other methods for stopping the jet at the end of the cut may also be used.

In at least some implementations, the trailback data obtained from the inspection device 1700 may be used to correct the lead angle in the same fashion as correcting for taper. The "bow" may or may not be considered in the correction.

Figure 18:
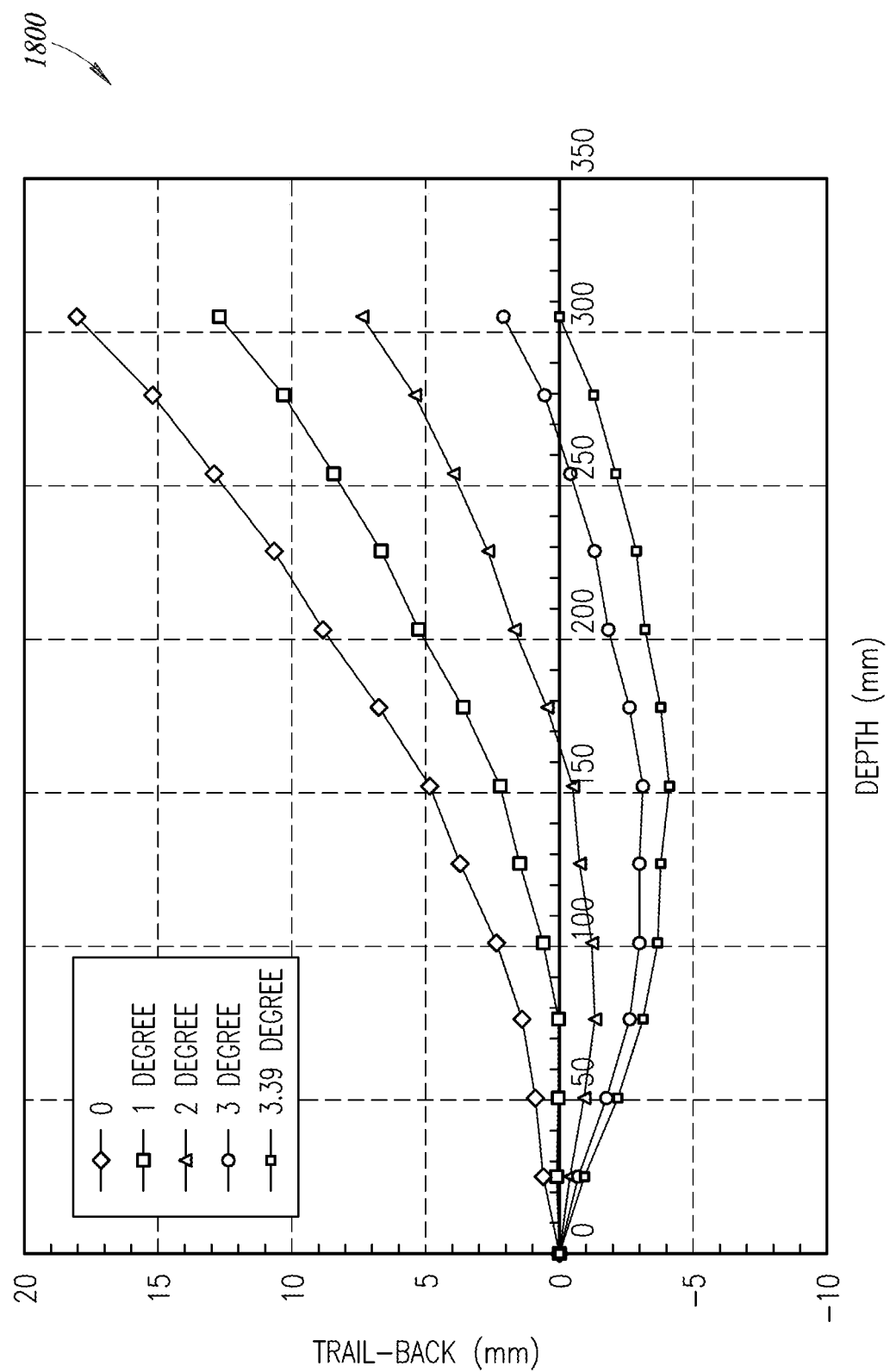
FIG. 18 is a plot that illustrates lead angle determination from inspected trailback data, according to one illustrated implementation.

FIG. 18 shows a plot 1800 of a lead angle determination from inspected trailback data. The plot 1800 includes trailback curves for lead angles of 0 degrees, 1 degree, 2 degrees, 3 degrees and 3.39 degrees. The nibble cut of the coupon may be made at either the 0 degree lead angle of the original profile, or at the predicted lead angle from the initial cutting process models. In the example shown in FIG. 18, the rotation angle ("lead") of the trailback profile may then be made to obtain zero trailback at the bottom of the coupon, as shown in the 3.39 degrees curve, or alternatively the 3 degrees curve may be selected to minimize the trailback through the depth of the cut of the coupon.

For parts with complex geometries where the thickness changes due to angles or bevels of cut, one or more approaches may be followed. For example, in a first approach, the actual thickness that will be encountered may be cut on a coupon cutting station or "inspection station" to determine the actual values of the taper and lead angle for corrections or use. In another approach, the range of thicknesses may be bracketed by a number (e.g., 3, 4) of thicknesses which will be cut at the inspection station and then a trend line may be used for interpolation. Then, coefficients of one or more existing cutting process models may be modified based at least in part on the inspection data.

Figure 19:
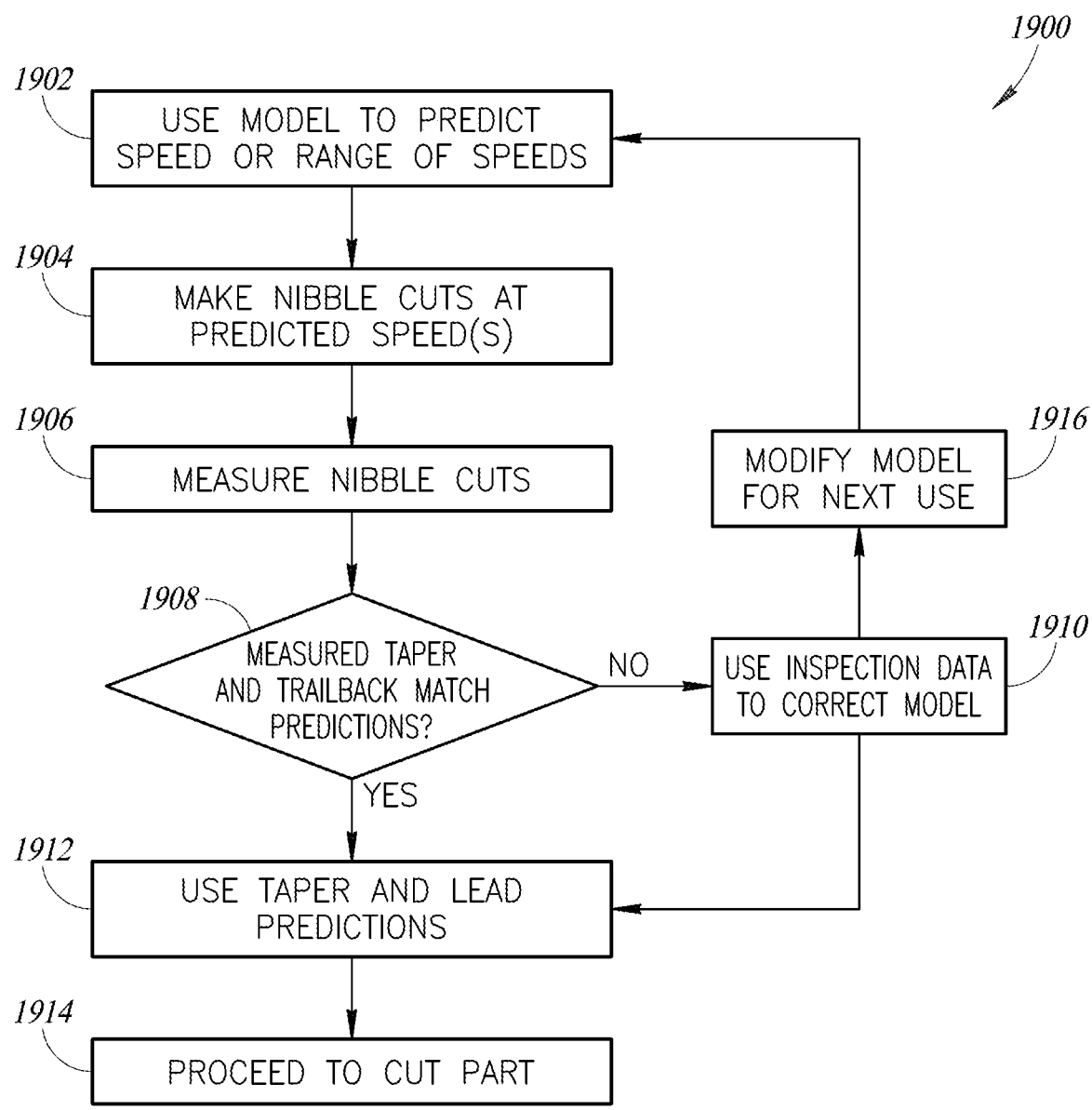
FIG. 19 is a flow diagram of a method of operating a fluid jet apparatus to cut a target object, according to one illustrated implementation.

FIG. 19 shows a flow diagram for a method 1900 of operating a fluid jet apparatus control system to cut a target object or part.

At 1902, at least one processor of the fluid jet apparatus control system may use one or more cutting process models to predict a cutting speed or a range of cutting speeds for a part to be cut based at least in part on a required surface finish, for example. The at least one processor may calculate or predict the taper and trailback based on the selected speed(s).

At 1904, the at least one processor may cause the fluid jet apparatus to make a cut (e.g., nibble cut) in a coupon of the same material as the target object. As an example, the coupon may be mounted on an inspection station accessible by one or more inspection devices that are operative to inspect cut(s) in the coupon. As discussed above, the cut of the coupon may be such that the exit of the jet is within the material by at least a determined distance (e.g., 0.25 inches), which determination may be based on prediction by the cutting process models. Alternatively, the cut may be long enough such that the total amount of trailback may be measured, as discussed above with reference to FIG. 17.

At 1906, the one or more inspection devices may inspect or measure various attributes of the cut(s) of the coupon. For example, the one or more inspection devices may measure the width profile, trailback profile, and/or trailback amount for one or more cuts made in the coupon.

At 1908, the at least one processor may determine whether the measured attributes (e.g., taper, trailback profile, trailback amount) received from the inspection device(s) match the values predicted by the cutting process models.

At 1910, responsive to determining that the measured attributes do not match the predicted values, the at least one processor may use the inspection data to correct one or more of the cutting process models. For example, the inspection data may be used to determine the corrections for taper and lead angles for the particular thickness of the material at the determined speed(s). At 1912, the at least one processor may use the corrected models to generate taper and lead angle predictions. Alternatively, responsive to determining that the measured attributes match the predicted values, the at least one processor may use the taper and lead angle predictions from the existing cutting process model(s). At 1914, the at least one processor may proceed to cause the fluid jet apparatus to cut the part using the determined taper and lead angle predictions.

At 1916, the at least one processor of the fluid jet apparatus control system may utilize the inspection data to modify one or more of the cutting process models for subsequent use (e.g., for cutting different but similar parts). As an example, a correction factor or modified prediction coefficients may be used by the cutting process models for improved predictions with the range of the material thickness.

Advantageously, the method 1900 converts the model prediction equations from "static" to "dynamic." In at least some implementations, the form of the prediction equations do not change, only the coefficients change based on the inspection data which may be obtained from time-to-time (e.g., periodically) at desired intervals.

As discussed above, various devices may be utilized to inspect a coupon or first article. Non-limiting examples of inspection devices include a laser sensor (e.g., laser height sensor), a vision camera, a mechanical touch probe, etc. In implementations wherein a laser sensor is utilized, a laser may scan an upper surface of the material along the nibble cut to detect the edge of the coupon. A lateral offset may be needed with about a 1.0 to 1.5 times the diameter of the mixing tube from the center of the nibble cut. The laser may also detect the end of the cut as the sensor travels along the center of the nibble cut. This process may be used to determine the length of the cut at the top surface of the material. When the laser sensor backs up with a focus length equal to the thickness of the material, the laser may detect the edge of the cut at the bottom surface of the material. The difference between these two lengths is the trailback amount.

To inspect the trailback profile and the kerf width profile, the sensor or the coupon may be rotated 90 degrees relative to one another. The laser may scan across the profile of the cut to detect the edges of the cut at intervals from the top surface of the sample coupon to the bottom surface of the sample coupon. The detected locations of the edges may be used to determine the width profile and the taper of the kerf. To inspect the trailback profile, the laser may travel in the center of the nibble cut from the top surface of the material of the coupon to the bottom surface while focused on the front of the cut profile.

A vision camera, touch probe, or other inspection device may also be used similarly to a laser sensor system. In such instances, like the laser system, a vision camera, touch probe or other inspection device may be mounted on an inspection station to inspect the cut of the coupon or first article.

In at least some implementations, a general model may be used to initially predict parameters to be used for cutting, such as taper angle, lead angle, and cutting speed. The coefficients of the equations may be modified before cutting the target part. The modification may be made based on the inspection data, as discussed above. Equation (1) below is an example equation for a kerf width model with several coefficients.

$$\frac{w_e}{d_m \sqrt{R}} = 0.335 \sqrt{\frac{X}{X_c}} \left[ 1 - \sqrt{\frac{\pi d_m^2 \sigma_f}{8 m_a (1-c)(V_a - Vc)^2} \frac{X}{X_c}} \right]^{2/3} \quad (1)$$

where,
$w_e$ is the width of the cut;
$V_a$ is the abrasive particle velocity, determined from another equation with additional coefficients;
$X_C$ is the jet length (coherency) characteristic;
$V_e$ is a threshold velocity (material dependent);
$\sigma_f$ is a material property;
c is an experimental factor of abrasive usage;
$d_m$ is the mixing tube diameter;
R is a ratio of Xc/dm;
X is axial distance from jet exit; and
$m_a$ is abrasive flow rate.

As discussed above, rather than predicting the jet deflections and shapes (and resulting taper and trailback) based on cut speed, acceleration and material machinability, in at least some implementations direct observation of the cut result may be used to correct the part or motion program and nozzle direction to result in an accurate part. An automatic algorithm that compares the measured geometry (e.g., top and bottom) to the desired CAD model generates geometric deviation from the CAD geometry. Computer-implemented algorithms may associate those geometric deviations with nozzle position and direction modifications in the part program. Methods of doing that include automatic best-fit matching with vector corrections, correcting on a per-segment basis if the CAD model is already broken up into segments for G-code programming, or many other methods.

In at least some implementations, multiple iterations might be desirable or required to converge on the desired level of finished part accuracy. Each iteration and resulting inspection/correction may lead to a better result and eventually converges on a very accurate part. In at least some implementations, the level of accuracy may be programmable (e.g., selected, input) by the user, and the iterations automatically executed until that level of accuracy is met. Automated decisions may include general reduction in speeds in cutting the part, for example if the resulting bottom edge quality is too wavy to hit the desired accuracy level.

In at least some implementations, the aforementioned method may be used in conjunction with an imperfect model of jet behavior based on speed, acceleration and material and jet properties. Such a model results in better initial cut accuracy. Starting with that better initial cut part enables reaching the desired final cut part accuracy with fewer iterations. In addition, in at least some implementations the direct geometric measurements may also be fed back into the model to refine parameters such as material or jet property parameters (e.g., machinability index, effective jet power). For example, if the measured geometry showed consistent taper (e.g., the correction vectors on average pointed out), then a correction factor may be generated to the machinability index for that specific material/jet combination so that the next new part cut using the same material and jet would be more accurate on the initial cut. The same may be done with direct trailback striation measurements, which then may be used to adjust or correct the modeling assumptions. Advantageously, the systems and methods discussed above improve the resulting geometry of the cut part and do not need prior knowledge of jet geometries, abrasive flow rates, material properties, etc. As long as the part can be cut, then the systems and methods are able to correct the geometry and cut a good part after a number of iterations.

In at least one implementation, a 3D laser scanner may be used to scan at least a portion of cut part. The bottom of the part, where the jet exits, can be measured by the scanner or other suitable measurement device. In at least some implementations, it may not be necessary for the cut part to remain in the cut position if the scanner or measurement device measures the entire part (e.g., including jet entry and exit). The gathered scan data may then be autonomously compared to the ideal CAD geometry. In at least some implementations, any striations on the part may be measured as well, giving direct measurement of trailback and jet geometry at that location. Correction vectors may be generated automatically, and those offsets may be autonomously applied to the entry and exit geometries of the part program. In at least some implementations, a single axis scanner (e.g., physical, optical, laser, other) may be used to detect cut edges only and correction may be made based on the cut edge locations and not any direct measurements of trailback on the sides of the cut part.

At least some of the implementations discussed herein provide significant advantages. For example, at least some of the implementations of the present disclosure reduce or eliminate the need to continuously improve "static" models which require significant amounts of time and costs. Further, at least some implementations account for one or more (e.g., numerous) variables which may or may not change during cutting processes. Additionally, at least some implementations allow for cutting more accurate parts by automatically and directly utilizing inspection data, and by utilizing the inspection data to modify the cutting process models. At least some implementations discussed herein also build on existing models which already provide significant well-developed kinematic strategies, thereby providing models which are even more accurate than previously achieved.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In at least one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification, including U.S. Pat. No. 6,766,216 issued on Jul. 20, 2004; U.S. Pat. No. 6,996,452 issued on Feb. 7, 2006; U.S. Pat. No. 8,423,172 issued on Apr. 16, 2013, and U.S. Patent Application No. 62/523,979 filed on Jun. 23, 2017, are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A fluid jet apparatus control system, comprising:
a controller clock;
at least one nontransitory processor-readable storage medium that stores at least one of processor-executable instructions or data; and
at least one processor communicably coupled to the at least one nontransitory processor-readable storage medium, in operation the at least one processor:
receives an initial motion program for a target object which is to be cut by a fluid jet apparatus;
receives a reference separation cut speed;
executes a motion program to cause the fluid jet apparatus to cut the target object according to the received initial motion program; and
from time-to-time during execution of the motion program,
autonomously receives at least one operational parameter of the fluid jet apparatus from at least one sensor;
autonomously determines a modified separation cut speed based at least in part on the received at least one operational parameter; and autonomously adjusts a clock rate of the controller clock to cause the fluid jet apparatus to cut the target object based at least in part on the modified separation cut speed.

2. The fluid jet apparatus control system of claim 1 where the at least one processor:
adjusts a clock rate of the controller clock so that a ratio of a new clock rate to a previous clock rate matches a ratio of the modified separation cut speed to a previous reference separation cut speed.

3. The fluid jet apparatus control system of claim 1 wherein the initial motion program including at least one of a lead angle program, a taper angle program, or a corner control program.

4. The fluid jet apparatus control system of claim 1 wherein the at least one sensor comprises at least one of a supply pressure sensor, an abrasive mass flow rate sensor or a force sensor.

5. The fluid jet apparatus control system of claim 1 wherein the at least one sensor comprises a supply pressure sensor and an abrasive mass flow rate sensor.

6. The fluid jet apparatus control system of claim 1 wherein the at least one processor:
receives a commanded percent cut speed of the fluid jet apparatus;
determines an actual percent cut speed of the fluid jet apparatus based at least in part on the received at least one operational parameter;
compares the actual percent cut speed of the fluid jet apparatus to the received commanded percent cut speed;
determines whether the actual percent cut speed differs from the commanded percent cut speed by more than an allowed percent cut speed threshold value; and
responsive to a determination that the actual percent cut speed differs from the commanded percent cut speed by more than the allowed percent cut speed threshold value:
causes a warning to be generated; or
causes the fluid jet apparatus to at least pause the cutting of the target object.

7. The fluid jet apparatus control system of claim 6 wherein the at least one processor:
receives the allowed percent cut speed threshold value from at least one user interface communicatively coupled to the at least one processor.

8. The fluid jet apparatus control system of claim 6 wherein responsive to a determination that the actual percent cut speed differs from the commanded percent cut speed by more than the allowed percent cut speed threshold value, the at least one processor:
causes at least one of a visual warning or an audible warning to be generated.

9. The fluid jet apparatus control system of claim 6 wherein responsive to a determination that the actual percent cut speed differs from the commanded percent cut speed by more than the allowed percent cut speed threshold value, the at least one processor:
causes to the fluid jet apparatus to terminate the cutting of the target object.

10. A method of autonomously controlling a fluid jet apparatus, the method comprising:
receiving, by at least one processor, an initial motion program for a target object which is to be cut by a fluid jet apparatus;
receiving, by at least one processor, a reference separation cut speed;
executing, by the at least one processor, a motion program to cause the fluid jet apparatus to cut the target object according to the received initial motion program; and
from time-to-time during execution of the motion program,
autonomously receiving, by the at least one processor, at least one operational parameter of the fluid jet apparatus from at least one sensor;
autonomously determining, by the at least one processor, a modified separation cut speed based at least in part on the received at least one operational parameter; and
autonomously adjusting, by the at least one processor, a clock rate of a controller clock to cause the fluid jet apparatus to cut the target object based at least in part on the modified separation cut speed.

11. The method of claim 10 wherein autonomously adjusting a clock rate of the controller clock comprises autonomously adjusting a clock rate of the controller clock so that a ratio of a new clock rate to a previous clock rate matches a ratio of the modified separation cut speed to a previous reference separation cut speed.

12. The method of claim 10, further comprising:
receiving, by the at least one processor, a commanded percent cut speed of the fluid jet apparatus;
determining, by the at least one processor, an actual percent cut speed of the fluid jet apparatus based at least in part on the received at least one operational parameter;
comparing, by the at least one processor, the actual percent cut speed of the fluid jet apparatus to the received commanded percent cut speed;
determining, by the at least one processor, whether the actual percent cut speed differs from the commanded percent cut speed by more than an allowed percent cut speed threshold value; and
responsive to determining that the actual percent cut speed differs from the commanded percent cut speed by more than the allowed percent cut speed threshold value:
causing, by the at least one processor, a warning to be generated; or
causing, by the at least one processor, the fluid jet apparatus to at least pause the cutting of the target object.

13. The method of claim 12 wherein causing a warning to be generated comprises causing at least one of a visual warning or an audible warning to be generated.

* * * * *